US011189197B2

(12) United States Patent
Quah et al.

(10) Patent No.: US 11,189,197 B2
(45) Date of Patent: Nov. 30, 2021

(54) LUNG SIMULATION APPARATUS

(71) Applicant: CHANGI GENERAL HOSPITAL PTE LTD, Singapore (SG)

(72) Inventors: Lishan Jessica Quah, Singapore (SG); Tsz Him Ching, Singapore (SG)

(73) Assignee: CHANGI GENERAL HOSPITAL PTE LTD, Singapore (SG)

( * ) Notice: Subject to any disclaimer, the term of this patent is extended or adjusted under 35 U.S.C. 154(b) by 650 days.

(21) Appl. No.: 16/079,453

(22) PCT Filed: Mar. 2, 2017

(86) PCT No.: PCT/SG2017/050097
§ 371 (c)(1),
(2) Date: Aug. 23, 2018

(87) PCT Pub. No.: WO2017/160228
PCT Pub. Date: Sep. 21, 2017

(65) Prior Publication Data
US 2019/0057625 A1     Feb. 21, 2019

(30) Foreign Application Priority Data

Mar. 17, 2016  (SG) ............................ 10201602102P

(51) Int. Cl.
*G09B 23/32*     (2006.01)
*G09B 23/28*     (2006.01)
(Continued)

(52) U.S. Cl.
CPC ............. *G09B 23/32* (2013.01); *G09B 23/28* (2013.01); *G09B 23/00* (2013.01); *G09B 23/285* (2013.01);
(Continued)

(58) Field of Classification Search
None
See application file for complete search history.

(56) References Cited

U.S. PATENT DOCUMENTS 3,298,132 A * 1/1967 Elwell .................... A63H 3/001
446/295
4,606,328 A * 8/1986 Thoman ................... A61F 7/02
446/199

(Continued)

FOREIGN PATENT DOCUMENTS

| CN | 203338649 U | 12/2013 | |
| SU | 535587 | * 11/1976 | ............ G09B 23/00 |
| WO | 2017/160228 A1 | 9/2017 | |

OTHER PUBLICATIONS

PCT/SG2017/050097 received an International Search Report dated Apr. 6, 2017, 4 pages.

(Continued)

*Primary Examiner* — James B Hull
(74) *Attorney, Agent, or Firm* — Kilpatrick Townsend & Stockton LLP

(57) ABSTRACT

There is provided a lung simulation apparatus for simulating a state of a living mammalian lung, the lung simulation apparatus comprising, a housing having a shape defined by an apex, an open base and a lateral surface that tapers from the open base to the apex; an elastic membrane covering the open base of the housing; an inflatable sac disposed within the housing, the sac being in substantial conformance with the shape of the housing and approximating the shape of the living mammalian lung, when in an inflated state; an internal space for containing fluid, the internal space being defined as the space between the housing and the inflatable sac and the space between the elastic membrane and the inflatable sac, wherein the space for containing fluid substantially complies with the anatomical dimensions of an intrapleural (Continued)

space of the living mammalian lung when the inflatable sac is in the inflated state. There is also provided a method of making the lung simulation apparatus.

31 Claims, 13 Drawing Sheets

(51) Int. Cl.
G09B 23/00 (2006.01)
G09B 23/30 (2006.01)
G09B 23/34 (2006.01)

(52) U.S. Cl.
CPC ............ *G09B 23/286* (2013.01); *G09B 23/30* (2013.01); *G09B 23/303* (2013.01); *G09B 23/306* (2013.01); *G09B 23/34* (2013.01)

(56) References Cited

U.S. PATENT DOCUMENTS

| | | | | |
|---|---|---|---|---|
| 6,874,501 B1* | 4/2005 | Estetter | ................ | G09B 23/288 |
| | | | | 128/205.13 |
| 2008/0298540 A1* | 12/2008 | Serban | ................... | G09B 23/32 |
| | | | | 378/18 |
| 2013/0177972 A1* | 7/2013 | Green | ................. | G06K 19/067 |
| | | | | 435/288.7 |

OTHER PUBLICATIONS

PCT/SG2017/050097 received an International Preliminary Report on Patentability dated Apr. 10, 2018, 16 pages.
PCT/SG2017/050097 received a Written Opinion of the International Searching Authority dated Apr. 6, 2017, 6 pages.

* cited by examiner

LUNG SIMULATION APPARATUS

TECHNICAL FIELD

The present disclosure relates broadly to a lung simulation apparatus and a method of making the lung simulation apparatus.

BACKGROUND

The lungs are a pair of spongy, air-filled organs situated on either side of the chest (thorax). The lungs are the primary organs of the respiratory system responsible for the process of respiration in humans. The lungs function to facilitate gaseous exchange which include extracting oxygen from the atmosphere and transferring it to the bloodstream, and releasing carbon dioxide from the bloodstream and into the atmosphere.

The lungs are surrounded by a thin layer of tissue called the pulmonary pleurae which are made up of the visceral and parietal pleura. The visceral pleura is a serous membrane which lines the surface of each lung while the parietal pleura is a serous membrane which lines the inner wall of the rib cage. The pleural cavity is a space between the parietal and visceral pleural within the human thorax, between the lung and the chest wall. Under normal physiological conditions, the pleural cavity contains small amounts of pleural fluid for lubrication during chest expansion in normal respiration.

However, abnormal or large amount of fluid may accumulate in the pleural cavity as a result of various diseases. Accumulation of air in the pleural cavity is termed as pneumothorax. Abnormal or excess accumulation of fluid in the pleural cavity is termed as pleural effusion (PE). Pleural effusion can be further categorized depending on the nature of fluid and cause of fluid entry into the pleural space. These include hydrothorax (serous fluid), hemothorax (blood), urinothorax (urine), chylothorax (chyle), or pyothorax (pus). The presence of excess fluid in the pleural cavity can impair breathing by limiting the expansion of the lungs.

The incidence of pleural effusion, regardless of its underlying etiology, is estimated to be 1.3 million per year in the United States of America.

The current practice for investigation of pleural effusion and management of pleural drainage varies widely. Insertion of needle(s) for fluid removal for diagnostic testing or insertion of percutaneous drainage catheters of varying calibers may be required. Expertise and training is required for knowledge and skill acquisition of the safe placement, monitoring and removal of these invasive devices, as such procedures carry inherent risks. Inadequate international consensus on optimal methods to achieve these have resulted in inconsistent and widely variable clinical practices. This may have an under-appreciated effect on patient safety outcomes.

It is likely that the incidence of pleural effusions requiring either inpatient or outpatient treatment will increase due to the increased risk of malignancies and lung infection, especially in countries with an aging population. As such, simulation models which can aid in the training of medical practitioners and allied health professionals for the management of pleural diseases are needed.

In general, medical device companies typically rely on animal models to test their medical products, e.g. pleural drainage devices, while students mostly rely on static models and mannequins to learn about invasive pleural procedures. Currently available lung simulation models are limited in their ability to provide a realistic representation of a living human lung.

For animal models, the anatomy of the animal lungs is ultimately different from humans. Therefore, the test results obtained from animal model may not translate well when applied on the human body. Furthermore, testing on animal model can be costly as the animals need to be procured, fed, housed and cared for. Most importantly, the use of animal models in research raises ethical issues.

As an alternative to animal lung models, artificial lung simulation models may be used for the purposes of medical device testing and medical training. However, currently known lung simulation models face several limitations as well. For example, the pleural space in currently available lung simulation models are mostly overly simplistic and serve only to provide visual simulation rather than a physiological simulation of the human lungs. This may be due to a lack of consideration on the importance of having anatomical and physiological accurate features. There is also a possibility of manufacturing constraints, resulting in the volume of the different spaces present in current lung simulation models to be inappropriate for the purpose of medical training.

There is also no avenue for the various current lung simulation models to realistically simulate different pulmonary diseased states of human. In addition, there is a lack of validated lung models that take into consideration both pleural pressure and simulation of diaphragmatic contraction in normal respiration as well as in pleural diseases.

Thus, there is a need for a lung stimulation apparatus and a method for making a lung simulation apparatus that seek to address or at least ameliorate one of the above problems.

SUMMARY

According to one aspect, there is provided a lung simulation apparatus for simulating a state of a living mammalian lung, the lung simulation apparatus comprising, a housing having a shape defined by an apex, an open base and a lateral surface that tapers from the open base to the apex; an elastic membrane covering the open base of the housing; an inflatable sac disposed within the housing, the sac being in substantial conformance with the shape of the housing and approximating the shape of the living mammalian lung, when in an inflated state; an internal space for containing fluid, the internal space being defined as the space between the housing and the inflatable sac and the space between the elastic membrane and the inflatable sac, wherein the space for containing fluid substantially complies with the anatomical dimensions of an intrapleural space of the living mammalian lung when the inflatable sac is in the inflated state.

In one embodiment, the lung simulation apparatus further comprises filler material disposed within the inflatable sac for maintaining structural shape of the inflatable sac when the internal space of the lung simulation apparatus has a pressure that is higher than a pressure of an internal volume of the inflatable sac.

In another embodiment, the lung simulation apparatus further comprises an actuator coupled to the elastic membrane for moving the elastic membrane to simulate diaphragmatic movement.

In another embodiment, the actuator comprises a motor coupled to an actuating arm.

In another embodiment, the actuating arm comprises a plate coupled to an elongate member.

In another embodiment, the actuator is configured to move in a direction from the base of the housing to the apex of the housing and to cause deformation of the elastic membrane such that there is a change in volume within the housing.

In another embodiment, the mammalian lung is a human lung.

In another embodiment, the shape of the housing approximates the shape of a mammalian hemithorax.

In another embodiment, the lung simulation apparatus is a single lung simulation apparatus for simulating a state of a single living mammalian lung.

In another embodiment, the inflatable sac disposed within the housing is the only inflatable sac disposed within the housing.

In another embodiment, the single lung simulation apparatus is capable of being coupled to another similar single lung simulation apparatus to simulate a state of a pair of living mammalian lungs.

In another embodiment, the lung simulation apparatus further comprises a port disposed on the housing for introduction or removal of fluid from the internal space.

In another embodiment, the lung simulation apparatus further comprises a port for coupling to a pressure sensor that is configured to measure the pressure in the internal space for containing fluid.

In another embodiment, the inflatable sac comprises an opening for allowing gaseous exchange between an internal volume of the inflatable sac and an external environment.

In another embodiment, the housing has a rigidity that is higher than that of the inflatable sac.

In another embodiment, the housing is substantially transparent.

In another embodiment, the filler material has a volume to mass ratio of from 10 cm$^3$/g to 150 cm$^3$/g for maintaining structural shape of the inflatable sac when in the inflated state.

In another embodiment, the elastic membrane covering the open base of the housing forms a substantially fluid-tight seal.

In another embodiment, the lung simulation apparatus further comprises liquid within the internal space for containing fluid.

In another embodiment, the internal space for containing fluid has a pressure of from about −25 cmH$_2$O to about 20 cmH$_2$O.

In another embodiment, the inflatable sac is inflated to a volume of from about 1700 ml to about 3500 ml.

In another embodiment, the inflatable sac is capable of automatically changing its volume through gaseous exchange in response to changes in pressure in the internal space for containing fluid.

According to another aspect, there is provided a method of making a lung simulation apparatus, the method comprising, using a first mold to form a housing, the housing having an apex, a lateral surface defined by an inner concave surface, an outer convex surface and an open base; using a second mold to form an inflatable sac having an opening and a base tapering to an apex when in an inflated state; disposing the inflatable sac within the housing; and covering the open base of the housing with an elastic membrane.

In one embodiment, the inflatable sac of the method disclosed herein comprises filler material for maintaining structural shape of the inflatable sac when the internal space of the lung simulation apparatus has a pressure that is higher than a pressure of an internal volume of the inflatable sac.

In another embodiment, the second mold is derived from the first mold or vice versa.

In another embodiment, the first mold is a positive mold of the second mold or vice versa.

In another embodiment, the method further comprises providing the first mold having a base tapering to an apex, and a convex outer lateral surface.

In another embodiment, the method further comprises providing the second mold having a base tapering to an apex, and a concave inner lateral surface.

In another embodiment, the step of providing the second mold comprises making the second mold using the first mold as a template.

In another embodiment, the step of covering the open base of the housing with an elastic membrane further comprises providing a fluid tight sealing.

In another embodiment, the method further comprises coupling an actuator to the elastic membrane.

DEFINITIONS

The term "patients" as used herein refers to mammalian patients which include but are not limited to human.

The term "a state" when used herein to describe a living mammal refers to a body state of the living mammal. The term "a state" may refer to a physiological state and/or a pathophysiological state.

The term "physiological state" as used herein broadly refers to a general state of a living subject which is characteristic of or appropriate to the living subject's healthy or normal functioning. Hence, when used to describe a living tissue or organ, the term "physiological state" includes any state that can possibly be assumed by the tissue or organ when the living subject is healthy and/or normal.

The term "pathophysiological state" as used herein broadly refers to a general state of a living subject which is characteristic of an abnormal/adverse/diseased state in the living subject. Hence, when used to describe a living tissue or organ, the term "pathophysiological state" includes any state that can possibly be assumed by the tissue or organ when the living subject is abnormal, or suffering from at least one adverse condition and/or disease. Examples of a pathophysiological state of a living human lung may include adverse states such as pleural effusion, pneumothorax, hemothorax and the like.

The term "anatomical dimension" as used herein broadly refers to anatomical dimension associated with a state of a living subject and therefore includes any dimensions that can possibly be assumed by the subject when it is alive. An anatomical dimension may include but are not limited to measurements such as length, circumference, thickness, mass, volume, pressure and the like.

The term "pulmonary compliance" as used herein is defined as a measure of the ease of expansion of the lungs and may be determined by pulmonary volume and elasticity. Lung compliance may be static or dynamic. Static lung compliance may be expressed as the change in volume for any given applied pressure. Dynamic lung compliance may be expressed as the compliance of the lung at any given time during actual movement of air.

The term "elastic recoil" as used herein is defined as the inherent resistance of a tissue to changes in shape, and the tendency of tissue to revert to its original shape once deformed.

The term "hemithorax" as used herein is defined as one side of the thorax, the cavity lateral to the mediastinum confined by the chest wall.

The term "pleural cavity" as used herein is defined as the thin fluid-filled space between the two pulmonary pleurae (visceral and parietal) of each lung.

The term "pleural effusion" as used herein is defined as a condition in which excess fluid accumulates in the pleural cavity.

The term "lateral surface" as used herein refers to all the sides of an object excluding the base of the object.

The term "substantially transparent to light" when used herein to describe an object is to be interpreted broadly to mean that 50% or more of the incident light normal to surface of the object can be transmitted through the object. In some examples, the object that is substantially transparent to light allow 60% or more, 65% or more, 70% or more, 80% or more, 85% or more, 90% or more or 95% or more of the incident light normal to surface of the object to be transmitted. In one example, the object that is substantially transparent to light allow above 70% of the incident light normal to surface of the object to be transmitted.

The term "inflated state" as used herein to describe an object such as an inflatable sac refers to a state where the inflatable sac has been infused with fluid such that the inflatable sac assumes a defined structural shape or form. This is in contrast to a state where the sac is substantially flaccid or amorphous.

The terms "coupled" or "connected" as used in this description are intended to cover both directly connected or connected through one or more intermediate means, unless otherwise stated.

The term "associated with", used herein when referring to two elements refers to a broad relationship between the two elements. The relationship includes, but is not limited to a physical, a chemical or a biological relationship. For example, when element A is associated with element B, elements A and B may be directly or indirectly attached to each other or element A may contain element B or vice versa.

The term "adjacent" used herein when referring to two elements refers to one element being in close proximity to another element and may be but is not limited to the elements contacting each other or may further include the elements being separated by one or more further elements disposed therebetween.

The term "and/or", e.g., "X and/or Y" is understood to mean either "X and Y" or "X or Y" and should be taken to provide explicit support for both meanings or for either meaning.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

Additionally, when describing some embodiments, the disclosure may have disclosed a method and/or process as a particular sequence of steps. However, unless otherwise required, it will be appreciated that the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

DESCRIPTION OF EMBODIMENTS

Exemplary, non-limiting embodiments of a lung simulation apparatus for simulating a state of a living mammalian lung, and a method of making the lung simulation apparatus are disclosed hereinafter.

There is provided a lung simulation apparatus for simulating a state of a living mammalian lung. In one embodiment, the lung simulation apparatus can simulate a physiological state of a living mammalian lung. In another embodiment, the lung simulation apparatus can simulate a pathophysiological state of a living mammalian lung. In another embodiment, the lung simulation apparatus can simulate a physiological state and can also simulate a pathophysiological state of a living mammalian lung.

The lung simulation apparatus may be a lung model that is suitable for training medical professionals with a physiological state of a healthy lung and a pathophysiological state of pulmonary effusion. The lung simulation apparatus may be constructed using anthropometric measurements of a human hemithorax and lung. Such anthropometric measurements may be obtained from databases and may be country/region specific, gender specific or age specific. With availability of anthropometric measurement data, the lung simulation apparatus may be customized to simulate the lung mechanism representing a particular group of people. The lung stimulation model may be an automatic lung stimulation model that has automated movements to simulate the breathing patterns of a mammalian lung.

The lung simulation apparatus disclosed herein may comprise a housing having a shape defined by an apex, an open base and a lateral surface that tapers from the open base to the apex; an elastic membrane covering the open base of the housing; an inflatable sac disposed within the housing, the sac being in substantial conformance with the shape of the housing and approximating the shape of the living mammalian lung, when in an inflated state; an internal space for containing fluid, the internal space being defined as the space between the housing and the inflatable sac and the space between the elastic membrane and the inflatable sac, wherein the space for containing fluid substantially complies with the anatomical dimensions of an intrapleural space of the living mammalian lung when the inflatable sac is in the inflated state.

The housing may be in the form of a shell and may have a shape which approximates the shape and profile of a hemithorax of a living mammal. The living mammal may be human or non-human primates such as rhesus and cynomolgus macaques. The living mammal may be an infant or an adult. The shape and profile of the hemithorax being approximated may be a normal and healthy hemithorax, or may be a defective or deformed hemithorax caused by disorders such as diseases or injuries.

The housing may have a substantially conical shape defined by an apex, an open base and a lateral surface that tapers from the open base to the apex. The external aspects of the housing comprising the apex and the lateral surface may be substantially convex, and the internal aspect of the housing may be substantially concave. The thickness of the housing may be substantially uniform or non-uniform, and may have a thickness of at least about 0.5 mm, at least about 1 mm, at least about 2 mm, at least about 3 mm, at least about 4 mm, or at least about 5 mm. The housing may be substantially rigid and does not change its shape substantially or flex in response to changes in fluid/air pressure within the housing. In various embodiments, the housing has a rigidity that is higher than that of the inflatable sac.

The housing may be substantially transparent to allow visual simulation and unobstructed viewing of the components inside the housing. The housing may be made of materials such as polymers e.g. polyvinyl chloride (PVC), polycarbonate (PC), poly(methyl methacrylate) (acrylic), polyethylene (PE), polypropylene (PP), polystyrene (PS), acrylonitrile butadiene styrene (ABS), cellulose acetate butyrate (butyrate) and glycol modified polyethylene terphthalate (PETG) and the like or combinations thereof. The materials for the housing may be in the form of sheets e.g. 1 mm thick, transparent PVC sheets, 1-2 mm transparent polycarbonate sheets and the like. In various embodiments, the materials used for making the housing preferably have at least one of the following qualities of low cost, ease of machining/fabrication, substantially resistant to scratches, and substantially transparent.

The housing may comprise one or more ports for fluid or gaseous exchange or for coupling to measurement devices. The housing may comprise a port for installation or removal of a replaceable inflatable sac. The housing may comprise a port for coupling to an opening in the inflatable sac to facilitate gaseous/fluid exchange between an internal volume of the inflatable sac and an external environment. The housing may comprise a port for introduction or removal of fluid from the internal space for containing fluid. The fluid may be injected into or withdrawn from the internal space for containing fluid using syringes. The housing may comprise a port for coupling to measurement apparatus e.g. pressure sensor/gauge, flowmeter and the like. The measurement apparatus may be a pressure sensor that is configured to measure the pressure in the internal space for containing fluid, or the pressure in the inflatable sac. The one or more ports on the housing may be sealed using adhesive e.g. marine sealant or silicone sealant, or using gaskets e.g. O-rings to provide fluid-tight sealing. The one or more ports may be disposed on the lateral surface of the housing at a position that is between the apex and the base of the housing.

The inflatable sac of the lung simulation apparatus may have a shape which approximates the shape and profile of a living mammalian lung when in an inflated state. The living mammal may be human or non-human primates such as rhesus and cynomolgus macaques. The living mammal may be an infant or an adult. The shape and profile of the lung being approximated may be a normal and healthy lung, or may be a defective or deformed lung caused by disorders such as diseases or injuries.

In the lung simulation apparatus, the inflatable sac may be in the form of a bag or balloon. It may be possible to have one or more inflatable sacs within a single housing. However, in various embodiments, there is only one inflatable sac disposed within the housing. The inflatable sac may comprise at least one opening for allowing gaseous exchange between the inflatable sac and its external environment. The inflatable sac may be positioned within the housing to simulate a living mammalian lung within the hemithorax. In the inflated state, the inflatable sac may have a substantially conical shape, the substantially conical shape being defined by a base tapering to an apex. In the inflated state, the surface of the inflatable sac may substantially line the inner surface of the housing, such that the shape of the inflatable sac is in substantial conformance with the shape of the housing and approximating the shape of the living mammalian lung.

Advantageously, the setup of the lung-shaped inflatable sac positioned within the hemithoracic shaped housing provides an anatomically close representation of the living mammalian lung within its hemithoracic cavity. The housing may represent the hemithoracic cavity and the parietal pleura, which is a serous membrane attached to the inner surface of the thoracic cavity, The inflatable sac may represent the living mammalian lung and the visceral pleura, which is a serous membrane covering the surface of the lung.

To mimic the shape and profile of a living mammalian lung, measurements may be obtained from sources such as anthropometric data or from subjects using imaging techniques such as 3D body scanners, magnetic resonance imaging (MRI). In one embodiment, the inflatable sac simulating a living human lung is based on linear measurements taken from an actual human lung having a height of about 265 mm in height, a first maximum width of about 190 mm measured from lateral to medial aspect of the lung, and a second maximum width of about 200 mm measured from anterior to posterior aspect of the lung.

Apart from the shape and profile, the inflatable sac may also be configured to mimic lung compliance and elastic recoil of a living mammalian lung. The properties of the inflatable sac may be varied to mimic a living mammalian lung by varying the thickness of the sac and the material for making the inflatable sac. The average thickness of the inflatable sac may be at least about 0.2 mm, at least about 0.3 mm, at least about 0.4 mm, at least about 0.5 mm, at least about 0.6 mm, at least about 0.7 mm, at least about 0.8 mm, at least about 0.9 mm, at least about 1.0 mm, at least about 1.1 mm, at least about 1.2 mm, at least about 1.3 mm, at least about 1.4 mm, or at least about 1.5 mm.

The inflatable sac may be made from material which is flexible, stretchable, elastic, non-porous and substantially impermeable to fluid. Examples of suitable material for making the inflatable sac may include elastomers such as latex, silicone rubber, nitrile rubber, neoprene rubber and the like. By varying the kind of material used and the thickness of the inflatable sac, elasticity of the inflatable sac may be adjusted to represent different levels of lung compliance.

Filler material may be disposed within the inflatable sac. Suitable filler material may include polymer fibres such as polyester fibres, and natural fillings such as down, kapok, cotton wool fibres, feathers, hemp and the like or combinations thereof.

Such filler materials may be helpful to maintain the structural shape of the inflatable sac when the internal space of the lung simulation apparatus has a pressure that is higher than a pressure of an internal volume of the inflatable sac.

The internal space of the lung simulation apparatus may be defined as the volume within the housing covered by the elastic membrane.

In addition, the filler material may assist the inflatable sac in simulating the elastic recoil of a living mammalian lung. The amount of filler material may be adjusted to represent different elastic recoil of the living mammalian lung in varying conditions. The elastic recoil can be a source of producing positive pleura pressure in the presence of pleural effusion in the pleura space.

In example embodiments, the filler material has a volume to mass ratio of from about 0.5 $cm^3/g$ to about 550 $cm^3/g$, from about 10 $cm^3/g$ to about 500 $cm^3/g$, from about 50 $cm^3/g$ to about 450 $cm^3/g$, from about 100 $cm^3/g$ to about 400 $cm^3/g$, from about 150 $cm^3/g$ to about 350 $cm^3/g$, from about 200 $cm^3/g$ to about 300 $cm^3/g$, from about 250 $cm^3/g$ to about 300 $cm^3/g$. In one embodiment, polyester fibres for use in a lung simulation apparatus can have a volume to mass ratio of about 63.5 $cm^3/g$. In another embodiment, cotton for use in a lung simulation apparatus can have a volume to mass ratio of about 0.64 $cm^3/g$. In another embodiment, down for use in a lung simulation apparatus can have a volume to mass ratio from about 175 $cm^3/g$ to about 520 $cm^3/g$.

The inflatable sac may be configured to have a volume which is representative of a living mammalian lung e.g. human lung in various states. In various embodiments, the inflatable sac has an inflated volume from about 1700 ml to about 2400 ml, from about 1800 ml to about 2300 ml, from about 1900 ml to about 2200 ml, from about 2000 ml to about 2100 ml, from about 2500 ml to about 3500 ml, from about 2600 ml to about 3400 ml, from about 2700 ml to about 3300 ml, from about 2800 ml to about 3200 ml, from about 2900 ml to about 3100 ml, or from about 2900 ml to about 3000 ml. In one embodiment, the inflatable sac has an inflated volume of about 1800 ml.

The inflatable sac may be configured to change its volume in response to changes in pressure in the internal space of the lung simulation apparatus or internal space for containing fluid. This may be representative of the tidal volume of a living mammalian lung e.g. human lung in various states such as physiological and/or pathophysiological states. The change in volume of the inflatable sac may be from about 25 ml to about 600 ml, from about 50 ml to about 600 ml, from about 100 ml to about 550 ml, from about 150 ml to about 500 ml, from about 200 ml to about 450 ml, from about 250 ml to about 400 ml, or from about 300 ml to about 350 ml.

The inflatable sac may be configured to have a compliance which is representative of a living mammalian lung e.g. human lung in various states such as physiological and/or pathophysiological states. In various embodiments, the inflatable sac has a compliance of about 0.15 $L/cmH_2O$, about 0.20 $L/cmH_2O$, about 0.25 $L/cmH_2O$, about 0.30 $L/cmH_2O$, about 0.35 $L/cmH_2O$, about 0.40 $L/cmH_2O$, about 0.45 $L/cmH_2O$, about 0.50 $L/cmH_2O$, about 0.55 $L/cmH_2O$, or about 0.60 $L/cmH_2O$. In various embodiments, the inflatable sac together with filler materials has an overall compliance of about 0.15 $L/cmH_2O$, about 0.20 $L/cmH_2O$, about 0.25 $L/cmH_2O$, about 0.30 $L/cmH_2O$, about 0.35 $L/cmH_2O$, about 0.40 $L/cmH_2O$, about 0.45 $L/cmH_2O$, about 0.50 $L/cmH_2O$, about 0.55 $L/cmH_2O$, or about 0.60 $L/cmH_2O$.

The elastic membrane may be capable of simulating the diaphragm of a living mammal. The elastic membrane may be deformed in a first direction towards the apex of the housing, forming a dome-shaped structure. The dome-shaped structure may represent the dome shape of a diaphragm in a living mammal during exhalation, where the diaphragm pushes upwards and applies pressure on the lungs. The elastic membrane may return to its un-deformed state to represent the state of a diaphragm in a living mammal during inhalation. During inhalation where volume within the thoracic cavity expands, air from the external environment is drawn into the inflatable sac to simulate inhalation.

The elastic membrane may be configured to form a fluid-tight seal over the open base of the housing of the lung simulation apparatus. The elastic membrane may be made from a stretchable and non-porous material which is substantially impermeable to water. The properties of the elastic membrane may be adjusted by using different materials with different elastic modulus and/or by varying the thickness of the elastic membrane.

Suitable materials for making the elastic membrane may be elastomers such as silicone rubber, latex rubber, neoprene rubber, and the like or combinations thereof. The thickness of the elastic membrane may be at least about 0.2 mm, at least about 0.3 mm, at least about 0.4 mm, at least about 0.5 mm, at least about 0.6 mm, at least about 0.7 mm, at least about 0.8 mm, at least about 0.9 mm, at least about 1.0 mm, at least about 1.1 mm, at least about 1.2 mm, at least about 1.3 mm, at least about 1.4 mm, or at least about 1.5 mm. In one embodiment, the elastic membrane has a thickness of about 0.41 mm.

The internal space for containing fluid may simulate the pleural cavity of a living mammalian lung. In various embodiments, the internal space for containing fluid may substantially comply with the anatomical dimensions of an intrapleural space of the living mammalian lung when the inflatable sac is in the inflated state.

The internal space may contain liquid with a certain viscosity or a combination of fluids with different viscosities to simulate different types of body fluid found in a pleural space having pleural effusion. Advantageously, the lung simulation apparatus may be able to simulate pleural effusion of different etiologies. The types of simulated body fluid may include serous fluid (hydrothorax), blood (hemothorax), urine (urinothorax), chyle (chylothorax), or pus (pyothorax), each having differing levels of viscosity. The fluid disclosed herein may comprise liquid, gas or a combination thereof. Therefore, apart from liquid, the internal space may also contain gas or air to simulate the pathophysiological state of pneumothorax in a living mammalian lung.

The quantity of fluid in the internal space may be varied to simulate different physiological states such as a normal healthy state or pathophysiological states such as an abnormal state of pleural effusion. One or more ports each comprising a valve may be provided on the housing of the lung simulation apparatus for infusing or withdrawing fluid from the internal space. The valve may be a one-way valve, two-way valve, three-way valve or multi-way valve. In one embodiment, the valve is a three way valve.

In various embodiments, the internal space for containing fluid has a fluid volume from about 100 ml to about 3000 ml, from about 200 ml to about 2900 ml, from about 300 ml to about 2800 ml, from about 400 ml to about 2700 ml, from about 500 ml to about 2600 ml, from about 600 ml to about 2500 ml, from about 700 ml to about 2400 ml, from about 800 ml to about 2300 ml, from about 900 ml to about 2200 ml, from about 1000 ml to about 2100 ml, from about 1100 ml to about 2000 ml, from about 1200 ml to about 1900 ml, from about 1300 ml to about 1800 ml, from about 1400 ml to about 1700 ml, or from about 1500 ml to about 1600 ml.

In one embodiment, the internal space for containing fluid has a fluid volume of about 3000 ml for simulating massive pleural effusion in a living mammalian lung, wherein the thoracic cavity is filled with liquid.

The internal space for containing fluid may be configured such that a user is able to adjust the pressure level within the internal space. The inflatable sac of the lung simulation apparatus may be capable of automatically changing its volume through gaseous exchange in response to changes in pressure in the internal space for containing fluid.

In various embodiments, the internal space for containing fluid has a pressure from about −40 $cmH_2O$ to about 40 $cmH_2O$, from about −35 $cmH_2O$ to about 35 $cmH_2O$, from about −30 $cmH_2O$ to about 30 $cmH_2O$, from about −25 $cmH_2O$ to about 25 $cmH_2O$, from about −20 $cmH_2O$ to about 20 $cmH_2O$, from about −15 $cmH_2O$ to about 15 $cmH_2O$, from about −10 $cmH_2O$ to about 10 $cmH_2O$, from about −5 $cmH_2O$ to about 5 $cmH_2O$, or from about −5 $cmH_2O$ to about 0 $cmH_2O$.

The lung simulation apparatus may further comprise an actuator coupled to the elastic membrane for moving the elastic membrane to simulate diaphragmatic relaxation and contraction. In some embodiments, the elastic membrane is connected to a shaft that is linearly driven by an electric motor to simulate diaphragmatic relaxation and contraction. The actuator may further comprise a motor coupled to an actuating arm. The actuating arm may comprise a plate coupled to an elongate member such as a shaft. The actuator may further comprise a processing member for controlling movement of the actuating arm. The processing member of the actuator may be one of the components of a control system which controls the type of movement. The actuator may provide the power in the lung simulation apparatus to move and deform the elastic membrane representing the diaphragm of a living mammal. The actuator may be a linear actuator, moving the actuating arm up and down to simulate diaphragmatic movement. The actuator may be programmed to vary its speed and magnitude to represent different lung tidal volume and respiratory rate.

The actuator may be configured to move in a direction from the base of the housing to the apex of the housing. Movement of the actuator may cause deformation of the elastic membrane, which in turn results in a change in volume within the internal space of the lung simulation apparatus. This may be representative of diaphragmatic movement in a living mammalian e.g. human. In various embodiments, the actuator is configured to move the plate coupled to the elastic membrane with a vertical displacement of at least about 2 cm, at least about 4 cm, at least about 6 cm, at least about 8 cm, at least about 10 cm, at least about 12 cm, at least about 14 cm, or at least about 16 cm.

The actuator may be configured to move at different speeds and frequency to simulate different respiratory rates. In various embodiments, the actuator is configured to move the plate coupled to the elastic membrane at a speed of at least about 1 cm/s, at least about 1.5 cm/s, at least about 2.0 cm/s, at least about 2.5 cm/s, at least about 3.0 cm/s, at least about 3.5 cm/s, at least about 4.0 cm/s, at least about 4.5 cm/s, at least about 5.0 cm/s, at least about 5.5 cm/s, at least about 6.0 cm/s, at least about 6.5 cm/s, or at least about 7.0 cm/s.

In various embodiments, the actuator is configured to move at a frequency of at least about 0.1 Hz, at least about 0.16 Hz, at least about 0.2 Hz, at least about 0.3 Hz, at least about 0.4 Hz, at least about 0.5 Hz, at least about 0.6 Hz, at least about 0.7 Hz, at least about 0.8 Hz, at least about 0.9 Hz, at least about 1 Hz, at least about 2 Hz, at least about 4 Hz, at least about 8 Hz, at least about 16 Hz, at least about 32 Hz, or at least about 40 Hz. In one embodiment, the actuator is configured to move at a frequency of at least about 0.71 Hz.

The lung simulation apparatus may be a single lung simulation apparatus for simulating a state of a single living mammalian lung. The single lung simulation apparatus may be coupled to another single lung simulation apparatus for simulating a state of a pair of living mammalian lungs. A single lung simulation apparatus may allow more realistic testing or study of respiratory mechanism as compared to a lung model simulation model comprising two lungs e.g. balloons within a single chamber.

In some embodiments, the lung simulation apparatus consists essentially of one or more characteristics discussed herein. In other embodiments, the lung simulation apparatus consists of one or more characteristics discussed herein.

There is also provided a method of making a lung simulation apparatus. The method may comprise, using a first mold to form a housing, the housing having an apex, a lateral surface defined by an inner concave surface, an outer convex surface and an open base; using a second mold to form an inflatable sac having an opening and a base tapering to an apex when in an inflated state; disposing the inflatable sac within the housing; and covering the open base of the housing with an elastic membrane.

The housing and inflatable sac of the lung simulation apparatus may be fabricated using molds. The molds may be formed using modelling materials such as clay, plaster of Paris or the like. The first mold for forming the housing may be shaped to represent a substantially symmetrical half of a hemithorax of a living mammal. The shape of the first mold may be a positive or negative mold. The second mold for forming the inflatable sac may be shaped to represent a substantially symmetrical half of a mammalian lung. The shape of the first mold may be a positive or negative mold.

In some embodiments, the first and second molds are not derived from each other. In other embodiments, the second mold is derived from the first mold or vice versa. The second mold for forming the inflatable sac may be derived from the first mold for forming the housing. For example, an additional layer of modelling material may be applied on the first mold to obtain/derive the shape of the second mold. In some embodiments, the mold for making the inflatable sac is derived from the mold for making the housing. In other embodiments, the mold for making the housing is derived from the mold for making the inflatable sac. In some embodiments, the mold for making the housing is a positive mold of the mold for making the inflatable sac. In other embodiments, the mold for making the inflatable sac is a positive mold of the mold for making the housing. In some embodiments, the step of making the mold of the inflatable sac comprises using the mold for making the housing as a template. In other embodiments, the step of making the mold of the housing comprises using the mold for making the inflatable sac as a template.

Various fabrication techniques for handling polymers may be used for making the housing of the lung simulation apparatus. These include thermoforming e.g. vacuum forming, extrusion of polymers, injection molding, blow molding, compression molding, transfer molding, laser sintering, and 3D printing.

In some embodiments, the methods disclosed herein consist essentially of one or more steps discussed herein. In other embodiments, the methods disclosed herein consist of one or more steps discussed herein.

DETAILED DESCRIPTION OF FIGURES

Example embodiments of the disclosure will be better understood and readily apparent to one of ordinary skill in the art from the following discussions and if applicable, in conjunction with the figures. It should be appreciated that other modifications related to structural, material and mechanical changes may be made without deviating from the scope of the invention. Example embodiments are not necessarily mutually exclusive as some may be combined with one or more embodiments to form new exemplary embodiments.

Figure 1:
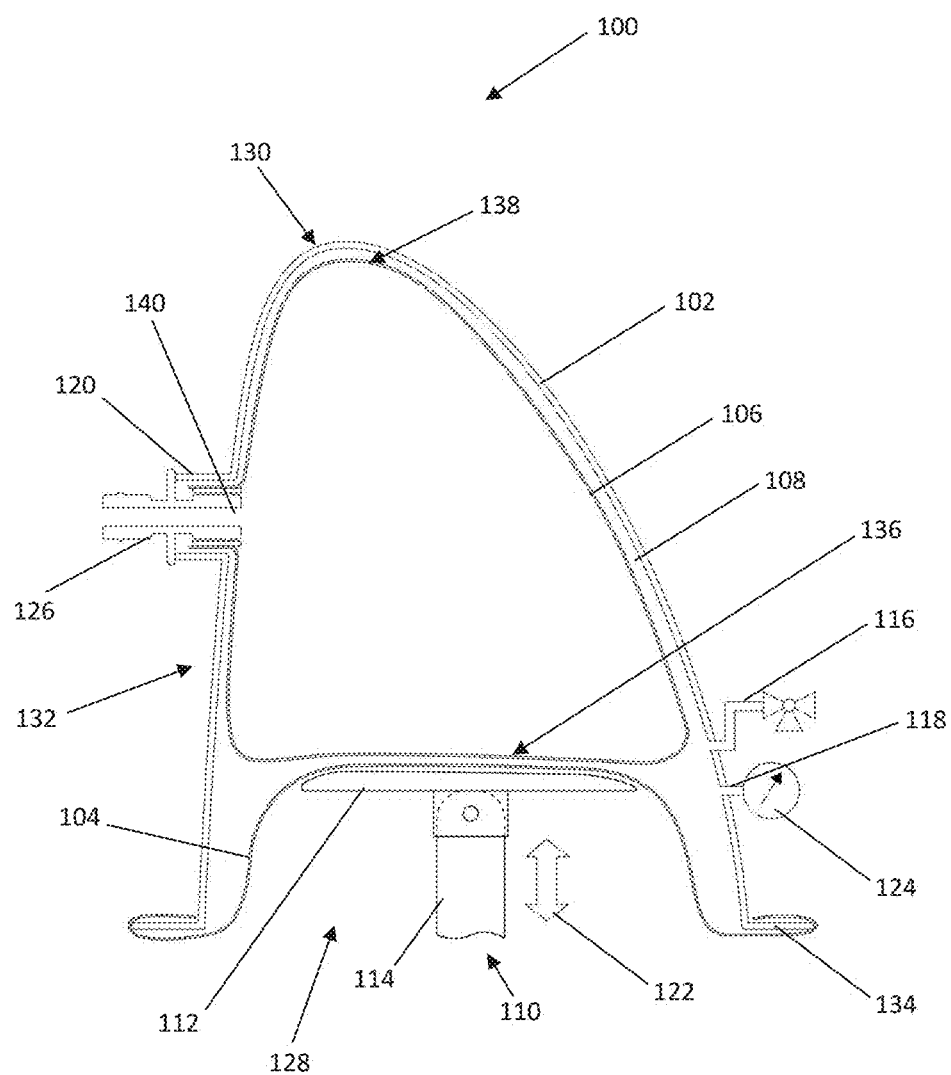
FIG. 1 is a schematic side view drawing of a lung simulation apparatus for simulating a state of a living mammalian lung in an example embodiment.

Referring to FIG. 1, there is shown a schematic side view drawing of a lung simulation apparatus 100 for simulating a state of a living mammalian lung in an example embodiment. The lung simulation apparatus 100 comprises a housing in the form of a PVC (poly vinyl chloride) shell 102 having an open base 128, an elastic membrane in the form of a latex cover 104 covering the open base 128 of the PVC shell 102, and an inflatable sac in the form of a lung-shaped latex balloon 106 disposed within the PVC shell 102. An internal space 108 for containing fluid is defined by the space between the PVC shell 102 and the latex balloon 106 and the space between the PVC shell 102 and the latex cover 104. The lung simulation apparatus 100 further comprises an actuator 110 coupled to the latex cover 104.

In the example embodiment, the lung simulation apparatus 100 is a single lung simulation apparatus for simulating the state of a single living mammalian lung. The single lung simulation apparatus is capable of being coupled to another single lung simulation apparatus to simulate a state of a pair of living mammalian lungs. In the example embodiment, the living mammalian lung being simulated is a human lung.

The PVC shell 102 has a substantially conical shape which approximates the shape of a mammalian hemithorax. The shape of the PVC shell 102 is defined by an apex 130, the open base 128 and a lateral surface 132 that tapers from the open base 128 to the apex 130. The external surfaces of the apex 130 and the lateral surface 132 of the PVC shell 102 are substantially convex. An external flange 134 is disposed at the circumference of the open base 128 of the PVC shell 102 to act as an anchor for the latex cover 104 covering the open base 128.

The PVC shell 102 is made from polymers using various fabrication techniques to form the shape of a hemithorax. To facilitate viewing the inside of the PVC shell 102, the material used for fabricating the PVC shell 102 is substantially transparent. To maintain the structural shape of a hemithorax, the PVC shell 102 is configured to have a rigidity that is higher than that of the latex balloon 106. In the example embodiment, the PVC shell 102 is made using vacuum forming and has a thickness of about 1 mm.

The PVC shell 102 further comprises one or more ports to perform various functions. In the example embodiment, the PVC shell 102 comprises a port 116 for introducing or removing fluid from the internal space 108, a port 118 for coupling to a pressure sensor 124 that is configured to measure the pressure in the internal space 108, and a port 120 for allowing gaseous exchange between the latex balloon 106 and an external environment.

The latex balloon 106 disposed within the PVC shell 102 simulates a living mammalian lung and has a substantially conical shape which approximates the shape of a living mammalian lung when in an inflated state. When in the inflated state, the latex balloon 106 has a base 136 tapering to an apex 138 and the surface of the latex balloon 106 substantially lines the lateral surface 132 of the PVC shell 102 and the surface of the latex cover 104, such that the shape of the latex balloon 106 is in substantial conformance with the shape of the PVC shell 102. The latex balloon 106 comprises an opening 140 for allowing gaseous exchange between the internal volume of the latex balloon 106 and an external environment. In the example embodiment, the opening 140 of the latex balloon 106 is coupled to the port 120 of the PVC shell 102. A hose connector 126 is coupled to the port 120 and is sealed using adhesive to form a fluid-tight seal.

The latex balloon 106 is made from elastomeric materials such as latex and is substantially pliable. In the example embodiment, a liquid latex molding rubber composition comprising 100% natural latex, ammonia and water, and conforming to ASTM Practice D-4236 is used for forming the latex balloon (Mold Builder Liquid Latex Rubber, Environmental Technology, Inc.). The latex balloon 106 is capable of automatically changing its volume through gaseous exchange in response to changes in pressure in the internal space 108 for containing fluid. The latex balloon 106 is capable of achieving an inflated volume from about 1800 ml to about 2600 ml. Filler material (not shown) is placed inside the latex balloon 106 to assist in maintaining the structural shape of the latex balloon 106 when in the inflated state, and to simulate the elastic recoil of a human lung. In this example embodiment, the filler material used is polyester fibres (Fairfield Poly-Fil Premium Polyester Fibre). The amount of polyester fibre can be adjusted to represent different elastic recoil of the human lung in varying conditions. The elastic recoil can be a source of producing positive pleura pressure in the presence of pleural effusion in the pleura space.

The latex cover 104 covering the open base of the PVC shell 102 simulates a diaphragm of a living mammal. The latex cover 104 is stretchable, non-porous and substantially impermeable to fluid. In the example embodiment, the latex cover is made from a latex sheet. The latex cover 104 forms a substantially air-tight seal over the open base of the PVC shell 102. Wall tension created in the latex cover 104 ensures fluid-tightness within the PVC shell 102.

To simulate diaphragmatic movement, the latex cover 104 is coupled to an actuator 110 which is configured to deform the latex cover 104. In the example embodiment, the actuator 110 is a concentric linear actuator with feedback (Pololu Concentric Linear Actuator with Feedback, Model Number: LACT4P-12V-5, with a stroke of 10.16 cm and maximum speed of 4.3 cm/s). The actuator 110 comprises a motor coupled to a plate 112 and an actuating arm 114. The actuator 110 is configured to move the plate 112 in a direction as defined by arrow 122. Upward movement of the plate 112 deforms the latex cover 104 upwards, resulting in a dome shape which resembles the shape of a diaphragm of a living mammal. Movement of the plate 112 simulates an inhalation mode and an exhalation mode during a breathing process.

To simulate the exhalation mode, the actuator 110 is configured to move the plate 112 upwards, causing deformation of the latex cover 104 to form a dome-shaped structure. In the exhalation mode, the volume within the PVC shell 102 decreases, this in turn causes the pressure within the PVC shell 102 to increase. As a result, air is expelled from the latex balloon 106 and exits to the external atmosphere via the port 120.

To simulate the inhalation mode, the actuator 110 is configured to move the plate 112 downwards, causing the latex cover 104 to flatten and return to its un-deformed state. In the inhalation mode, the volume within the PVC cover 102 increases, this in turn causes the pressure within the PVC cover 102 to decrease. As a result, air is drawn in from the external atmosphere via the port 120, causing the latex balloon 106 to be inflated.

In the example embodiment, the internal space 108 for containing fluid is defined as the space between the PVC shell 102 and the latex balloon 106 and the space between the latex cover 104 and the latex balloon 106. The internal space 108 for containing fluid substantially complies with the anatomical dimensions of an intrapleural space of the living mammalian lung when the latex balloon 106 is in the inflated state. To adjust the volume of fluid within the internal space 108, fluid can be introduced or withdrawn via the port 116. The pressure within the internal space 108 is monitored by the pressure sensor 124 which is coupled to the port 118. The pressure of the internal space 108 and the volume of fluid within the internal space 108 can be adjusted until the internal space 108 substantially complies with the anatomical dimensions of the living mammalian lung. The pressure in the internal space 108 is constantly monitored e.g. every 0.5 sec by the pressure sensor 124.

Figure 2A:
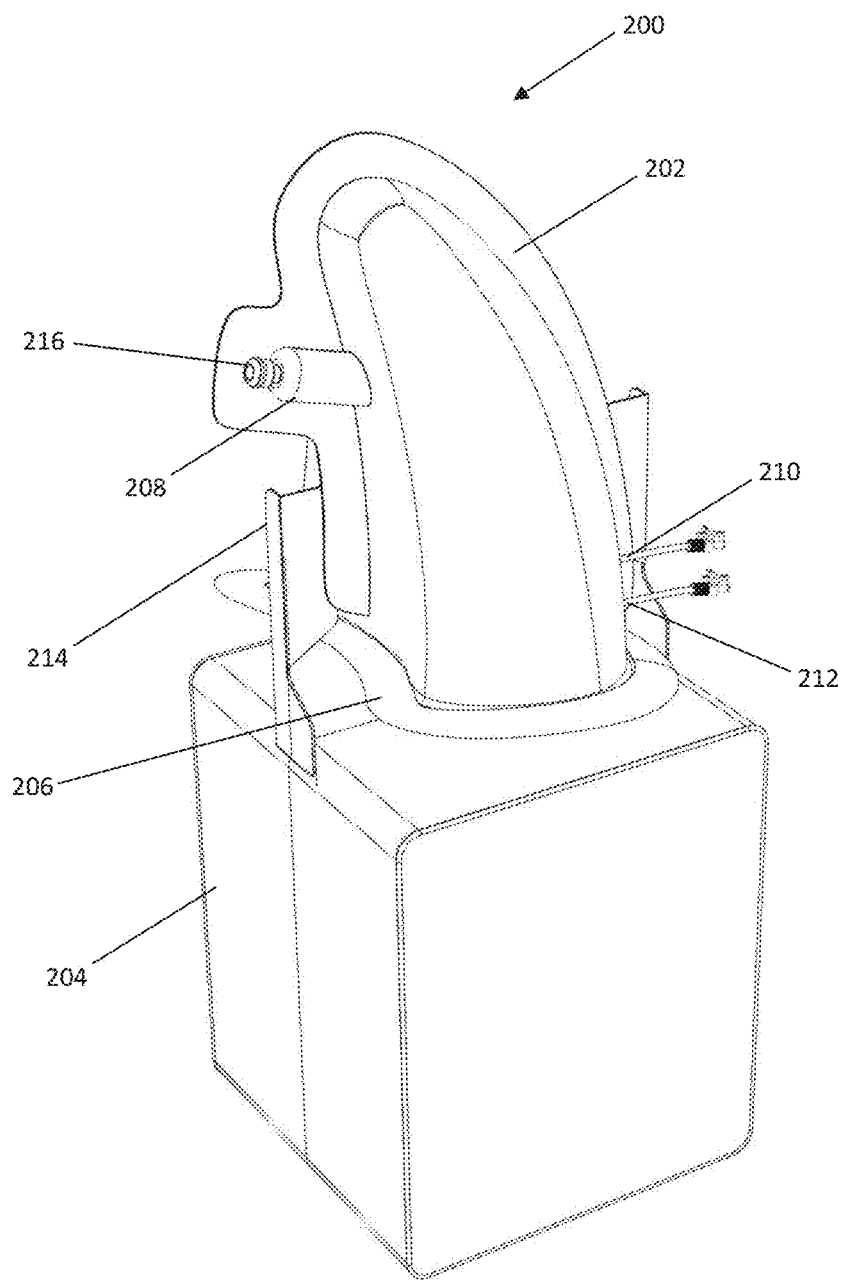
FIG. 2A is a schematic perspective view drawing of a lung simulation apparatus for simulating a state of a living mammalian lung in an example embodiment.

FIG. 2A is a schematic perspective view drawing of a lung simulation apparatus 200 for simulating a state of a living mammalian lung in an example embodiment. The lung simulation apparatus 200 comprises a housing in the form of a PVC shell 202 mounted on a container 204.

The PVC shell 202 is modeled in the shape of a hemithorax and comprises an inflatable sac in the form of a lung-shaped latex balloon (not shown but an example illustration is provided as 106 of FIG. 1) within the PVC shell 202. The PVC shell 202 has an open base (not shown but an example illustration is provided as 128 of FIG. 1) which is covered by an elastic membrane in the form of a latex cover 206. The latex cover 206 forms a fluid-tight seal over the open base of the PVC shell 202. The PVC shell 202 comprises one or more ports to perform various functions. Port 208 is disposed on the PVC shell 202 to simulate the bronchus of a mammalian lung, and functions to facilitate installation and removal of the latex balloon from inside the PVC shell 202. A hose connector 216 is coupled to the port 208 using adhesive material e.g. marine sealant. In the example embodiment, the PVC shell 202 further comprises a port 210 for introduction or removal of fluid from the interior of the housing 202 and a port 212 for coupling to measurement apparatus such as pressure sensors for measuring the pressure within the housing 202. Valves in the form of three-way valves are connected to port 210 and 212 for regulating flow of fluid.

The container 204 is an enclosure for bearing the load of the PVC shell 202 and for housing an actuator (not shown but an example illustration is provided as 110 of FIG. 1). The container 204 comprises a box and a cover. The box is assembled using sheets of material which is substantially inflexible and is suitable for load-bearing applications. In the example embodiment, the container 204 is assembled using aluminium sheets of 1.5 mm thickness and the cover is made of fabric e.g. canvas. The container 204 further comprises a pair of supports 214 for engaging to and supporting the PVC shell 202. In the example embodiment, the pair of support 214 is a pair of aluminium L-beams.

Figure 2B:
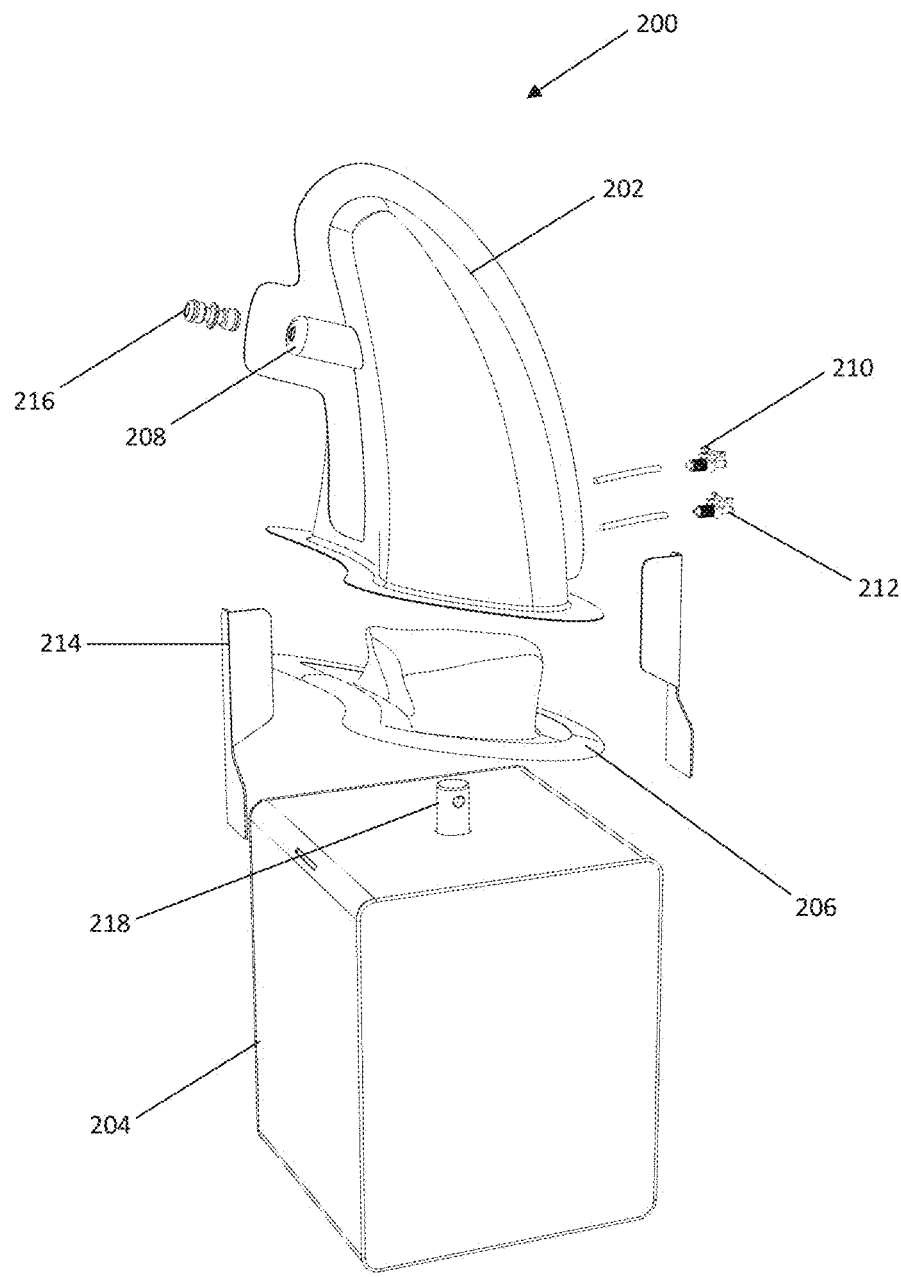
FIG. 2B is an exploded view of the lung simulation apparatus for simulating a state of a living mammalian lung in the example embodiment of FIG. 2A.

FIG. 2B is an exploded view of the lung simulation apparatus 200 for simulating a state of a living mammalian lung in the example embodiment of FIG. 2A.

In the example embodiment, the PVC shell 202 has an open base (not shown but an example illustration is provided as 128 of FIG. 1) which is covered by the latex cover 206 to form a fluid-tight seal. The latex cover 206 is flexible and conforms to the shape of the open base as well as the interior of the PVC shell 202. The hose connector 216 is configured to be coupled to the port 208 to form a fluid-tight seal. The port 210 for introduction or removal of fluid from the interior of the housing 202 and the port 212 for coupling to measurement apparatus comprise a tubing coupled to a valve e.g. 3-way valve. The container 204 houses the actuator and has an opening at the top of the container 204 for allowing an actuating arm 218 (compare 114 of FIG. 1) of the actuator to pass through.

Figure 3:
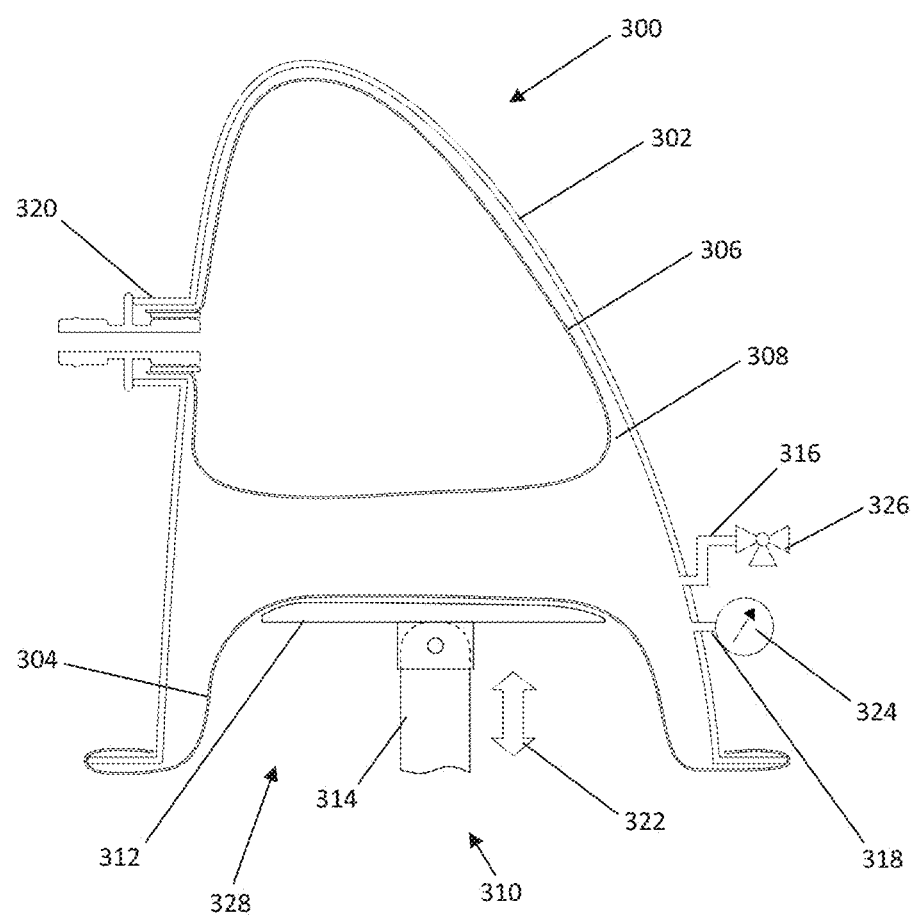
FIG. 3 is a schematic side view drawing of a lung simulation apparatus 300 for simulating an abnormal state of a living mammalian lung in an example embodiment.

FIG. 3 is a schematic side view drawing of a lung simulation apparatus 300 for simulating an abnormal state of a living mammalian lung in an example embodiment. Similar to FIG. 1, the lung simulation apparatus 300 comprises a housing in the form of a PVC shell 302 with an open base 328, the open base 328 of the PVC shell 302 being covered by an elastic membrane in the form of a latex cover 304. The PVC shell 302 simulates the hemithorax of a living mammal. An inflatable sac in the form of a latex balloon 306 is disposed within the PVC shell 302 and functions to simulate a living mammalian lung. An internal space 308 is defined by the space defined by the space between the PVC shell 302 and the latex balloon 306 and the space between the PVC shell 302 and the latex cover 304.

In the example embodiment, the lung simulation apparatus 300 is simulating a state of pleural effusion whereby fluid is introduced into the internal space 308 via a port 316 disposed on the PVC shell 302. A pressure sensor 324 coupled to a port 318 of the PVC shell 302 measures any changes in pressure within the PVC shell 302. With an increased volume of fluid in the internal space 308, the pressure in the internal space increases, causing the volume of the latex balloon 306 to decrease.

The lung simulation apparatus 302 further comprises an actuator 310 coupled to the latex cover 304. The actuator 310 comprises an actuating arm 314 coupled to a plate 312. Movement of the plate 312 in the direction 322 causes the latex cover 304 to deform and simulate diaphragmatic movement. In the example embodiment, the lung simulation model 300 is capable of simulating exhalation and inhalation via the upward and downward movements of the plate 312. In the state of pleural effusion, movement of plate 312 results in a smaller volume of air expelled or drawn into the inflatable sac 306 via port 320. The quantity of fluid in the internal space 308 can be varied by infusing fluid into the internal space 308 via a three-way valve 326. The viscosity of fluid within the internal space can also be varied to simulate the different types of fluid infused into the pleura space of a living mammalian lung. In effect, the lung simulation apparatus 300 simulates the decreased total lung capacity found in a living mammalian lung having pleural effusion.

Figure 4:
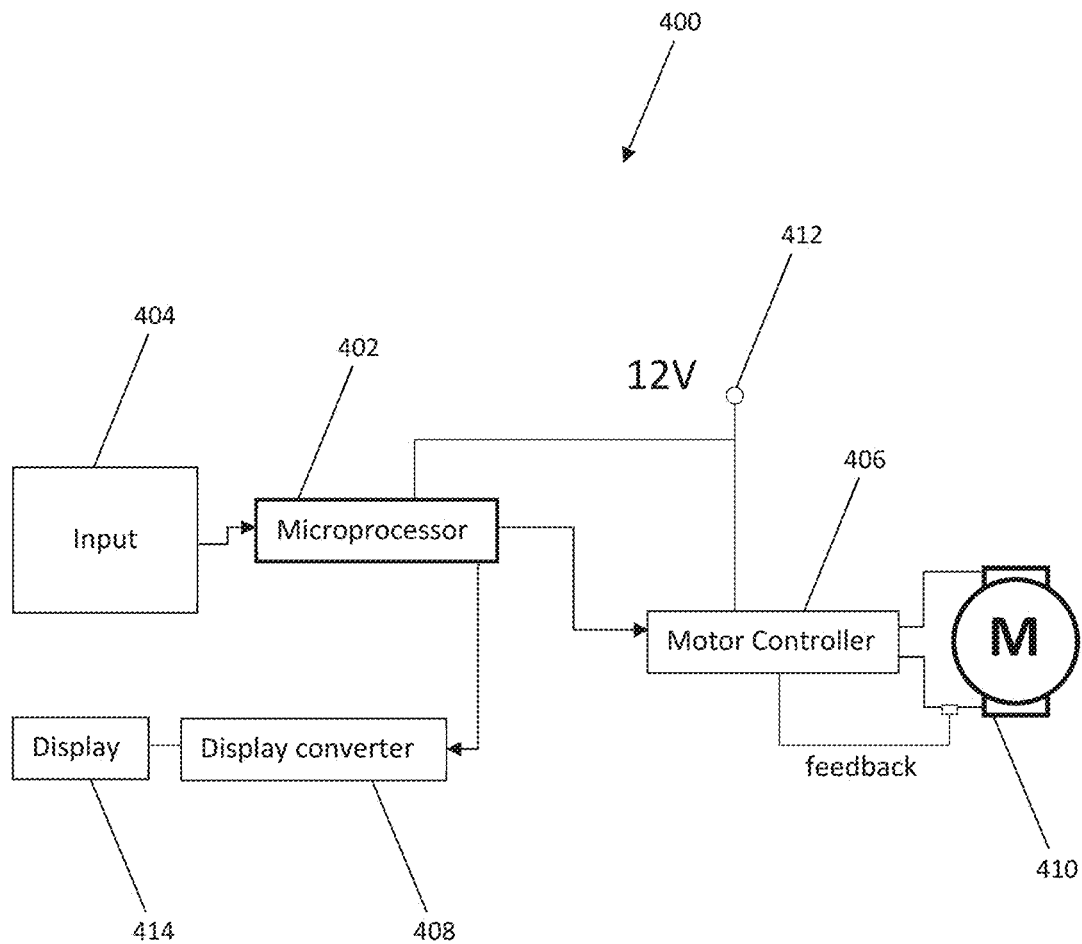
FIG. 4 is a schematic diagram of a control system for a lung simulation apparatus in an example embodiment.

FIG. 4 is a schematic diagram of a control system 400 for a lung simulation apparatus in an example embodiment. A microprocessor 402 receives input from an input source 404, e.g. buttons, joysticks etc. The microprocessor 402 then sends an output to a motor controller 406 and a display converter 408, e.g. an I2C converter which is coupled to a display 414. The motor controller 406 amplifies the signal received from the microprocessor 402 and sends the amplified signal to a linear actuator 410. A 12-V power source 412 for powering the control system is a lithium-polymer battery. The linear actuator 410 provides the mechanical power to move the elastic membrane (not shown but illustrations are provided as 204 and 304 of FIGS. 2 and 3 respectively) of a lung simulation apparatus.

FIG. 5 is a series of photographs illustrating a method for making a lung simulation apparatus in an example embodiment. FIG. 5A is a photograph of a first positive mold 502 in an example embodiment. A mold resembling the shape of a mammalian lung is first hand sculpted using clay. Upon drying, the lung-shaped mold is cut into half to form the first positive mold 502 comprising two half molds. FIG. 5B is a photograph showing formation of a second negative mold 504 in the example embodiment. Plaster e.g. plaster of Paris is applied onto both halves of the first positive mold 502 to form the second negative mold 504.

Figure 5A:
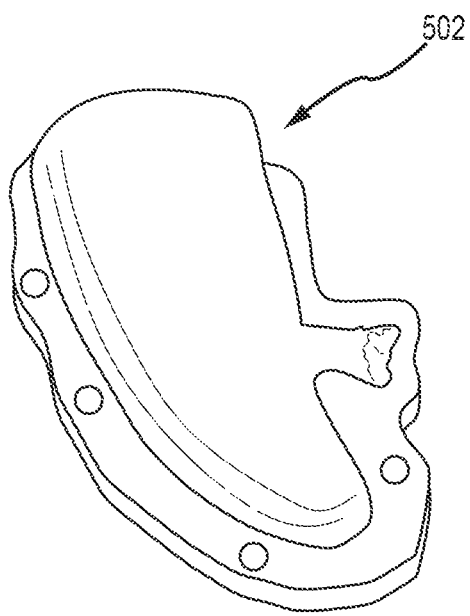
FIG. 5A is a photograph of a first positive mold in an example embodiment.
Figure 5B:
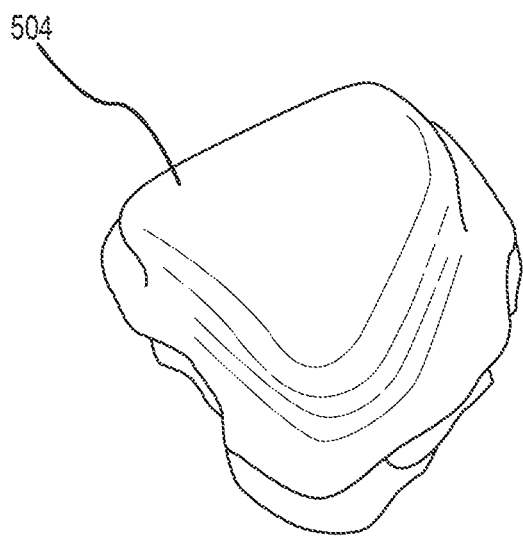
FIG. 5B is a photograph showing formation of a second negative mold in the example embodiment of FIG. 5A.
Figure 5C:
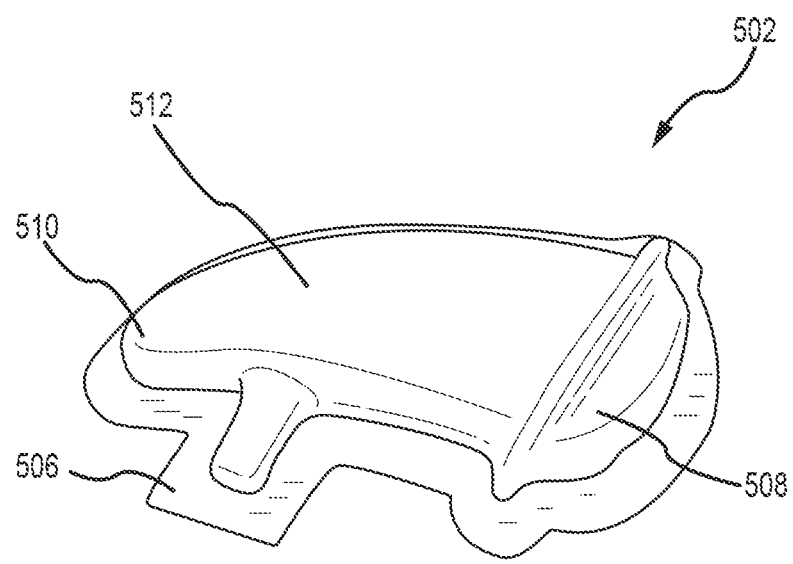
FIG. 5C is a photograph of the completed first positive mold in the example embodiment of FIG. 5A.

FIG. 5C is a photograph of the completed first positive mold 502 in the example embodiment. The first positive mold 502 is placed on a flat base 506 and immobilized in a fixed position, ready for use as a mold for forming a housing of the lung simulation apparatus. The first positive mold 502 comprises a base 508 tapering to an apex 510 and a convex outer lateral surface 512.

Figure 5D:
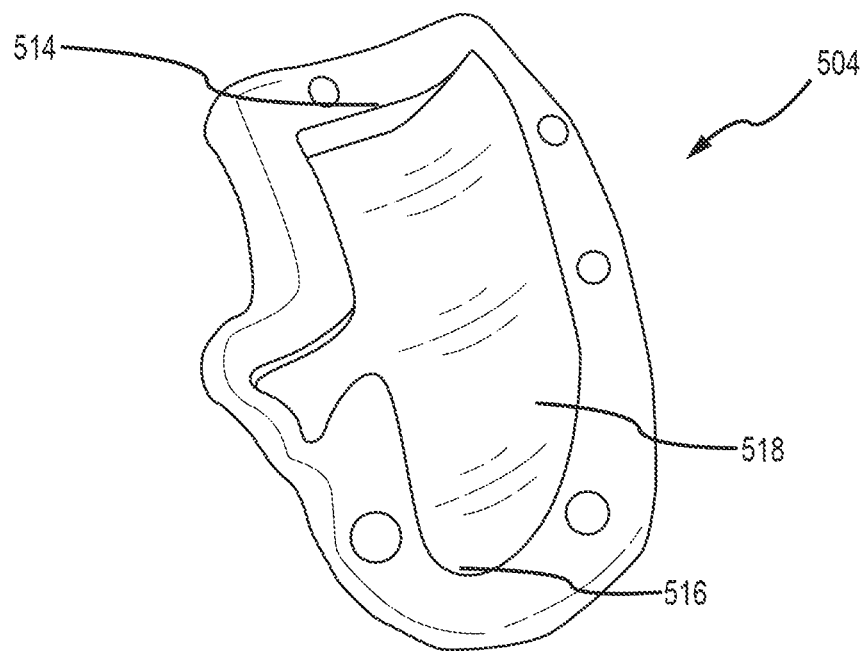
FIG. 5D is a photograph of the second negative mold incorporating additional features in the example embodiment of FIG. 5A.

FIG. 5D is a photograph of the second negative mold 504 incorporating additional features in the example embodiment. The second negative mold 504 is ready for use as a mold for forming an inflatable sac of the lung simulation apparatus. The second negative mold 504 comprises a base 514 tapering to an apex 516, and a concave inner lateral surface 518.

Figure 5E:
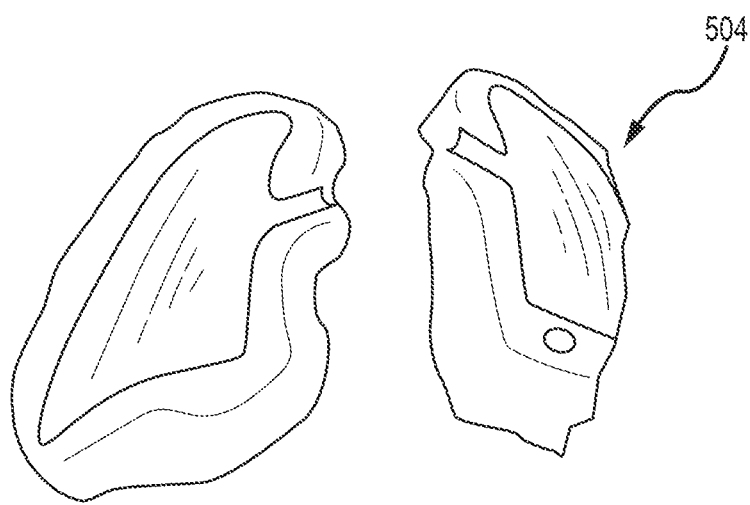
FIG. 5E is a photograph showing formation of the inflatable sac of the lung simulation apparatus in the example embodiment of FIG. 5A.

FIG. 5E is a photograph showing formation of the inflatable sac of the lung simulation apparatus in the example embodiment. Elastomer e.g. liquid latex is applied onto the second negative mold 504 to form a substantially even first layer. A sponge is used for applying the liquid latex. The first layer is left to dry for at least 24 hours. The process is repeated to apply a second and a third layer of liquid latex. The number of layers of latex can be increased accordingly to obtain the required thickness and mechanical properties of the inflatable sac. Two halves of the inflatable sac are obtained from the two halves of the second negative mold 504. The two halves of the inflatable sac are adhered together using liquid latex to form the inflatable sac.

Figure 5F:
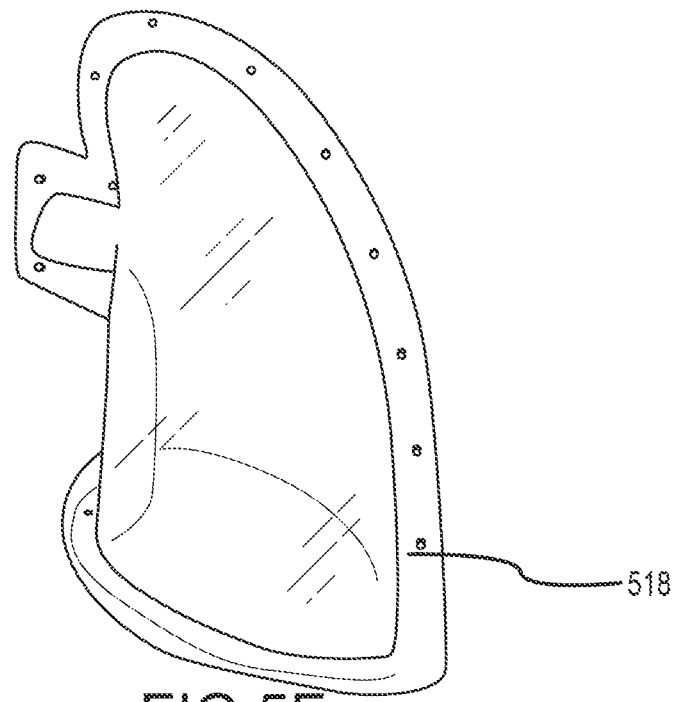
FIG. 5F is a photograph of the housing of the lung simulation apparatus in the example embodiment of FIG. 5A.

FIG. 5F is a photograph of the housing 518 of the lung simulation apparatus in the example embodiment. A transparent, 1 mm thick PVC sheet is applied onto the first positive mold 502 using vacuum forming to form one half of the housing 518 of the lung simulation apparatus. The vacuum formed halves are then trimmed to remove excess material, and fastened together using fastening means e.g. nuts and bolts. Adhesive sealant e.g. marine sealant is used to seal any gaps between the two halves of the housing 518 to ensure fluid-tightness.

Figure 5G:
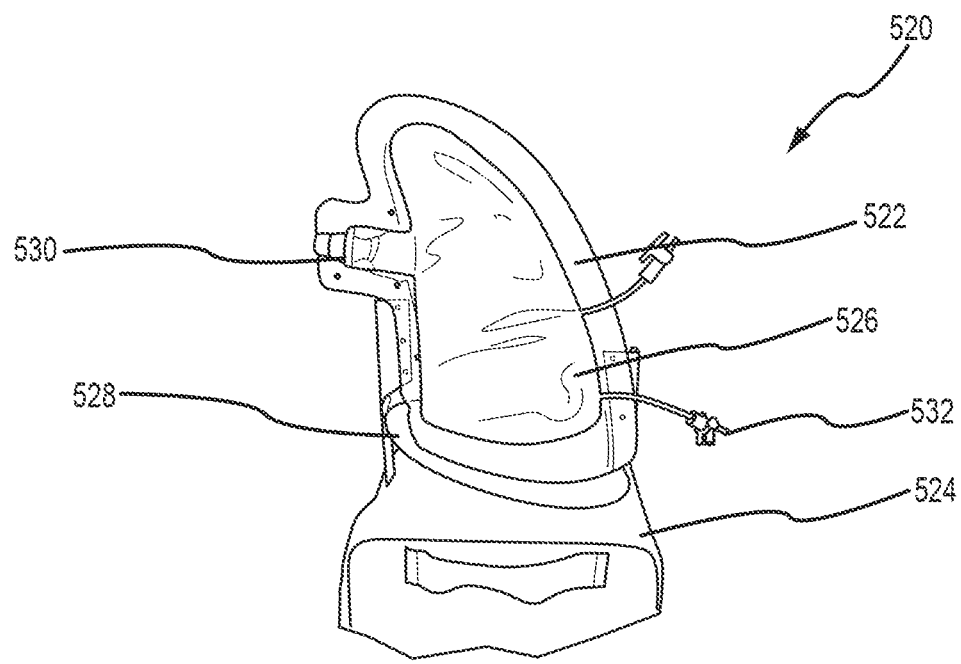
FIG. 5G is a photograph of the assembled lung simulation apparatus in the example embodiment of FIG. 5A.

FIG. 5G is a photograph of the assembled lung simulation apparatus 520 in the example embodiment. The lung simulation apparatus 520 comprises a PVC shell 522 shaped in the form of a hemithorax mounted on a container 524 containing an actuator. The PVC shell 522 is a transparent housing with an open base representing the thoracic cavity walls and parietal pleura of a living mammal. A lung-shaped latex balloon 526 is disposed within the PVC shell 522 and represents the visceral pleura and lung of a living mammal. A latex cover 528 covering the open base of the PVC shell 522 represents the diaphragm of a living mammal. The latex balloon 526 is attached to the PVC shell 522 via a port 530 disposed on the PVC shell 522. Approximately 300 ml of water is poured into the PVC shell 522 before the latex cover 528 is stretched and wrapped over the open base of the PVC shell 522 to form a fluid tight sealing. Prior to wrapping the open base of the PVC shell 522 with the latex cover 528, a plate (not shown) is secured to the latex cover 528 using fastening means e.g. nuts and bolts. In the example embodiment, the plate is a flat sheet of acrylic support coupled to an actuating arm of an actuator via a coupler. After the latex cover 528 is fitted to the base, remaining air pockets in an internal space between the PVC shell 522 and the latex balloon 526 are pumped out via a 3-way valve/tap 532 using a syringe. The PVC shell 522 with the latex balloon 526 and latex cover 528 fitted thereon is mounted on the container 524.

Figure 5H:
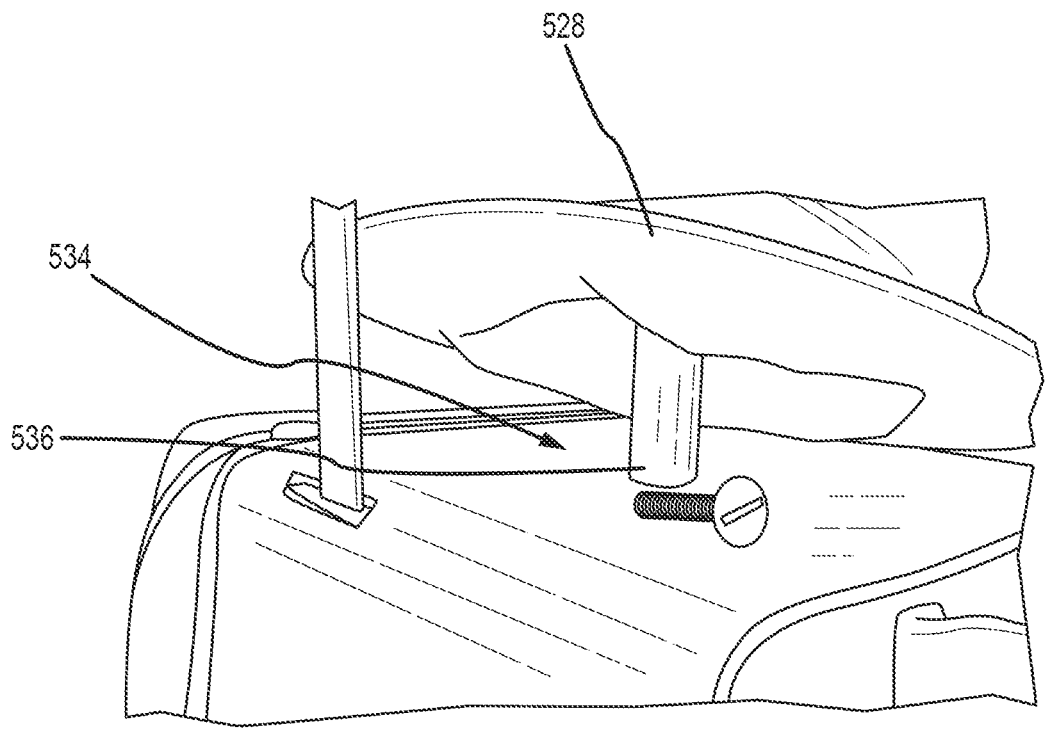
FIG. 5H is a photograph showing the interface between the lung model and the actuator in the example embodiment of FIG. 5A.

FIG. 5H is a photograph showing the interface between the latex cover 528 and the actuator 534 in the example embodiment. The actuator 534 comprises an actuating arm 536 and a plate (not shown) which couple to the latex cover 528.

Figure 6:
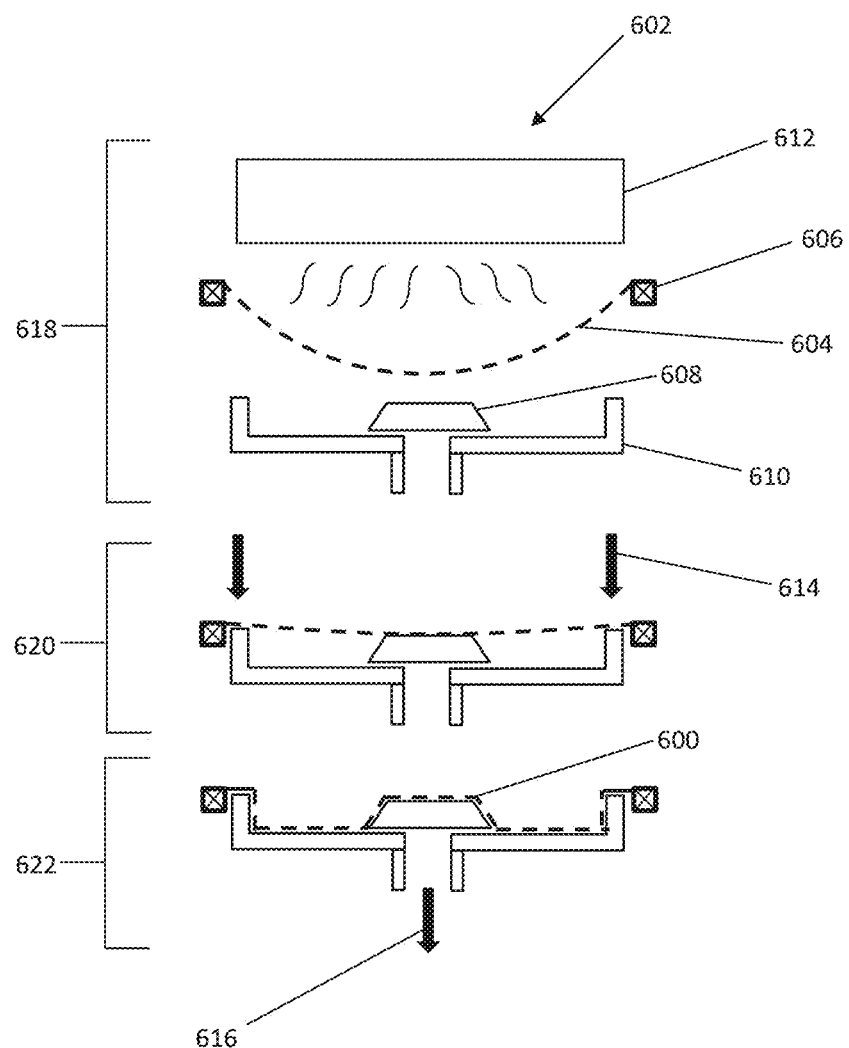
FIG. 6 is a schematic diagram illustrating a vacuum forming process for making a housing of a lung simulation apparatus in an example embodiment.

FIG. 6 is a schematic diagram illustrating a vacuum forming process for making a housing of a lung simulation apparatus in an example embodiment. The housing of the lung simulation apparatus is made up of two substantially symmetrical halves in the form of PVC shells 600 assembled together. Each PVC shell 600 of the housing has a profile representing half of a hemithorax of a living mammal. A vacuum forming machine 602 is used for forming each half 600 of the housing. In step 618, a thermoplastic in the form of a PVC sheet 604 of about 1 mm thickness is first mounted on supports 606 of the vacuum forming machine 602. Still in step 618, a mold 608 for forming the PVC shell 600 is positioned on a platform 610 of the vacuum forming machine 602. Also in step 618, heat is applied via a heater 612 to raise the temperature of the PVC sheet 604 to a forming temperature. In step 620, once the PVC sheet 604 reaches forming temperature, the supports 606 holding the PVC sheet 604 moves down towards the mold 608 in the direction represented by arrow 614. In step 622, vacuum 616 is then applied to force the PVC sheet 604 to stretch and conform to the shape of the mold 608. The PVC shell 600 with its final formed shape is removed from the mold once the temperature drops below the forming temperature. The other substantially symmetrical half of the housing is also formed using the process as described above. Once the two halves of the PVC shell 600 are formed, the two halves are assembled together using fastening means such as nuts and screws. Sealing adhesive in the form of marine sealant is used to adhere the two halves of the PVC shell 600 together, forming a fluid tight seal.

Figure 7:
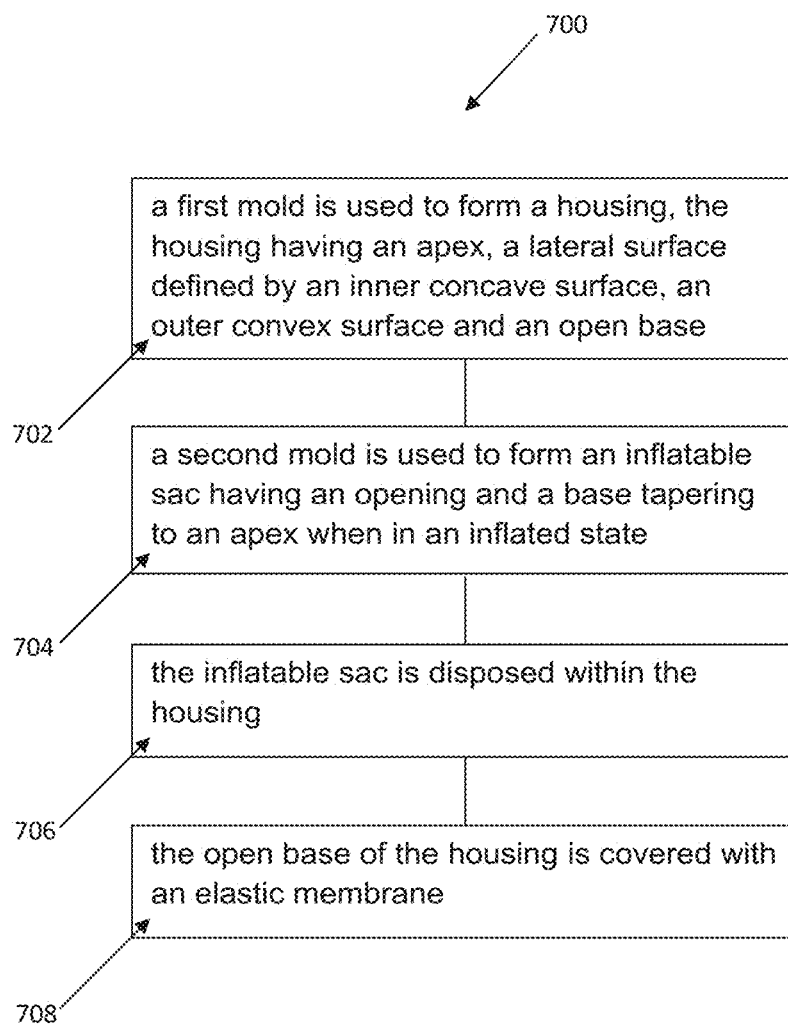
FIG. 7 is a schematic flowchart for illustrating a method for making a lung simulation apparatus in an example embodiment.

FIG. 7 is a schematic flowchart 700 for illustrating a method for making a lung simulation apparatus in an example embodiment. At step 702, a first mold is used to form a housing, the housing having an apex, a lateral surface defined by an inner concave surface, an outer convex surface and an open base. At step 704, a second mold is used to form an inflatable sac having an opening and a base tapering to an apex when in an inflated state. At step 706, the inflatable sac is disposed within the housing. At step 708, the open base of the housing is covered with an elastic membrane.

EXAMPLES

Example embodiments of the disclosure will be better understood and readily apparent to one of ordinary skill in the art from the following examples, tables and if applicable, in conjunction with the figures.

Figure 8:
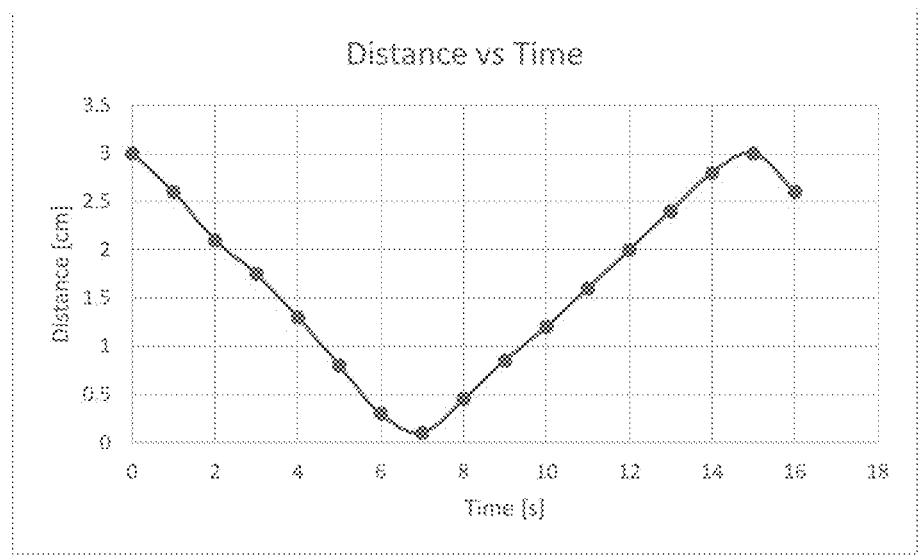
FIG. 8 is a graph showing displacement over time of an actuator in a lung simulation apparatus in an example embodiment.

Example 1—Measuring Changes in Diaphragmatic Movement During Simulation of a Breathing Cycle FIG. 8 is a graph showing displacement over time of an actuator in a lung simulation apparatus in accordance with one embodiment disclosed herein. The actuator is configured to move an elastic membrane of the lung simulation apparatus to simulate a single breathing cycle. At time, t=0 second, the elastic membrane is at a starting position whereby the elastic membrane assumes a dome shape representing the diaphragm in a relaxed state during exhalation. To create this dome shape in the elastic membrane, the actuating arm of the actuator is displaced by about 3 cm towards an apex (an example illustration is provided as 130 of FIG. 1). From time t=0 to t=7, the actuating arm moves downwards by about 3 cm away from the apex. At t=7 seconds, the elastic membrane returns to its un-deformed state which represents the diaphragm in a contracted state during inhalation. From time t=7 to t=15, the actuating arm moves upwards by about 3 cm towards the apex, causing the elastic membrane to return to its original position at t=0 second.

Figure 9:
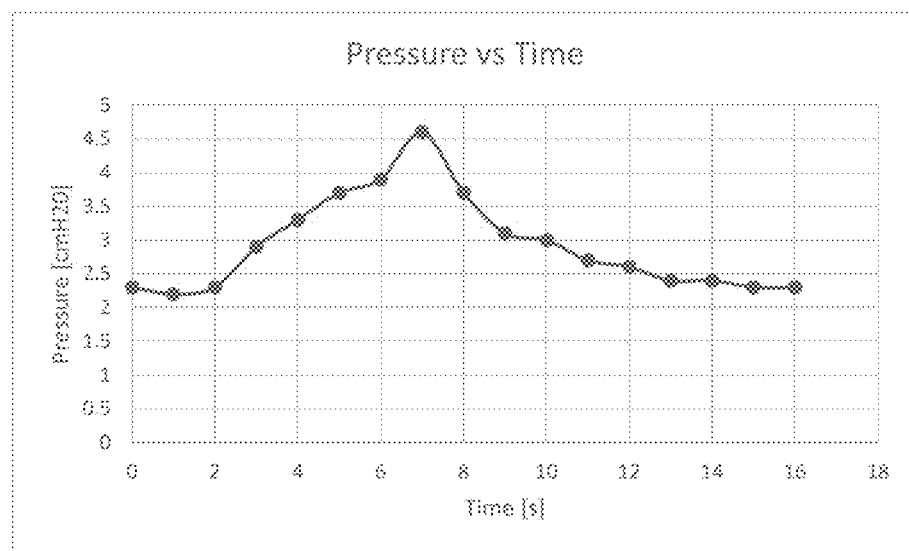
FIG. 9 is a graph showing change in pressure of an internal space for containing fluid within a lung simulation apparatus in an example embodiment.

Example 2—Measuring Change in Intrapleural Pressure During Simulation of a Breathing Cycle FIG. 9 is a graph showing change in pressure of an internal space for containing fluid within a lung simulation apparatus in an example embodiment. The lung simulation apparatus is configured to simulate a single breathing cycle using the same settings as that provided to achieve the results of FIG. 8. The pressure readings are obtained by coupling a pressure sensor to a port which is in direct communication with the internal space for containing fluid. The internal space for containing fluid represents the intrapleural space within a living mammalian lung. As shown in FIG. 9, the pressure readings obtained over a breathing cycle approximates the intrapleural pressure in the intrapleural space of a living mammalian lung.

Example 3—Measuring Average Thickness and Compliance of a Latex Balloon

Table 1 shows a series of measurements to quantify the thickness of latex balloons fabricated by applying 3, 4 and 5 layers of liquid latex. The latex balloon represents a living human lung in a lung simulation apparatus in accordance with one embodiment disclosed herein. Latex balloons of different thicknesses are formed by varying the number of layers of liquid latex applied during fabrication. Each thickness reading is measured using a digital Vernier caliper. The average thickness of each latex balloon is obtained by taking the average of four measurements at different locations of the latex balloon. As shown, the thickness of a latex balloon increases with the number of liquid latex applied during fabrication.

TABLE 1

| | Thickness (mm) | | |
|---|---|---|---|
| Reading | Balloon 1 (3 layers) | Balloon 2 (4 layers) | Balloon 3 (5 layers) |
| 1 | 0.46 | 0.43 | 0.56 |
| 2 | 0.33 | 0.53 | 0.59 |
| 3 | 0.38 | 0.39 | 0.56 |
| 4 | 0.32 | 0.47 | 0.63 |
| Average Thickness (mm) | 0.37 | 0.45 | 0.58 |

The latex balloon formed by applying 3 layers of latex is further characterized after installation into the lung simulation apparatus. 225 ml of fluid (water) is introduced into the internal space for containing fluid. The lung simulation apparatus is configured to simulate a single breathing cycle using the same settings as that provided to achieve the results of FIG. 8.

Based on the above settings in the lung simulation apparatus, the change in pressure measured within the internal space for containing fluid is about 2.2 cmH$_2$O. Over the same breathing cycle, the change in volume of the latex balloon measured is about 375 ml. Based on these measurements, the compliance of the latex balloon is calculated to be about 170 ml/cmH$_2$O.

APPLICATIONS

Embodiments of the disclosure provided herein may provide a lung simulation apparatus for simulating a state of a living mammalian lung, the lung simulation apparatus having dimensions which substantially complies with the anatomical dimensions of a living mammalian lung. In particular, the embodiments of the disclosure provided herein may provide a lung simulation apparatus which provides an accurate representation of the pleural space of a living mammalian lung. Advantageously, embodiments of the lung simulation apparatus provide accurate visual as well as physiological/pathophysiological simulation of diaphragmatic movement and pleural pressure. Embodiments of the lung simulation model disclosed herein may serve as an educational tool to provide medical practitioners and students with a realistic simulation of negative pleural pressure and diaphragmatic movements during practice of invasive procedures involving the pleural cavity. This enhances visual training for users such as medical professionals and students.

Embodiments of the disclosure provided herein may provide a lung simulation apparatus which may be used as a substitute for animal models in device testing. By having dimensions which substantially complies with the anatomical dimensions of a living mammalian lung, embodiments of the disclosure provided herein may provide a realistic model which serves as a better alternative to animal models in terms of cost, degree of similarity and ethical issues.

Embodiments of the disclosure provided herein may also provide a lung simulation apparatus which is superior over existing lung simulation models known in the art. Current pre-existing lung models do not simulate static and dynamic intra-pleural pressure. Advantageously, embodiments of the disclosure provided herein may provide a lung simulation apparatus which simulates both pleural pressure and diaphragmatic contraction in respiration of a normal lung as well as of a lung with pleural effusion. Embodiments of the disclosure provided herein may overcome or ameliorate the inadequacy of current lung models for simulation of pleural diseases. Developers of medical devices may carry out initial tests on the lung simulation apparatus to evaluate their devices.

Embodiments of the lung simulation apparatus may be capable of realistically simulating different pulmonary diseased states of human by varying different parameters. The lung simulation apparatus as disclosed in the present disclosure may be capable of simulating negative and positive pleural pressures. The lung simulation apparatus as disclosed in the present disclosure may be capable of simulating diaphragmatic movement with variable respiratory rate, and/or variable magnitude for diaphragmatic movement resulting in dynamic positive and negative intra-pleural pressure. The lung simulation apparatus as disclosed in the present disclosure may also be capable of simulating pleural effusion with variable volume and type of effusion fluid infused from an external port. Embodiments of the lung simulation apparatus disclosed herein may allow constant monitoring of pleural pressure in pleural effusion throughout the respiratory cycle and simulation of device insertion and fluid drainage.

Advantageously, embodiments of the lung simulation apparatus provided herein may allow testing of invasive pleural drainage devices whilst simulating diaphragmatic movement and pleural pressure. Embodiments of the simulation apparatus disclosed herein may allow adjustments to lung compliance and lung elastic recoil to investigate its impact on concurrent pleural diseases.

It will be appreciated by a person skilled in the art that other variations and/or modifications may be made to the embodiments disclosed herein without departing from the spirit or scope of the disclosure as broadly described. The present embodiments are, therefore, to be considered in all respects to be illustrative and not restrictive.

What is claimed is:

1. A lung simulation apparatus for simulating a state of a living mammalian lung, the lung simulation apparatus comprising,
    a housing having a shape defined by an apex, an open base and a lateral surface that tapers from the open base to the apex;
    an elastic membrane covering the open base of the housing;
    an inflatable sac disposed within the housing, the sac being in substantial conformance with the shape of the housing and approximating the shape of the living mammalian lung, when in an inflated state;
    an internal space for containing fluid, the internal space being defined as the space between the housing and the inflatable sac and the space between the elastic membrane and the inflatable sac,
    wherein the space for containing fluid has substantially the same dimensions as the anatomical dimensions of an intrapleural space of the living mammalian lung when the inflatable sac is in the inflated state.

2. The lung simulation apparatus as claimed in claim 1, further comprising filler material disposed within the inflatable sac for maintaining structural shape of the inflatable sac when the internal space of the lung simulation apparatus has a pressure that is higher than a pressure of an internal volume of the inflatable sac.

3. The lung simulation apparatus as claimed in claim 1, further comprising an actuator coupled to the elastic membrane for moving the elastic membrane to simulate diaphragmatic movement.

4. The lung simulation apparatus as claimed in claim 3, wherein the actuator comprises a motor coupled to an actuating arm.

5. The lung simulation apparatus as claimed in claim 4, wherein the actuating arm comprises a plate coupled to an elongate member.

6. The lung simulation apparatus as claimed in claim 3, wherein the actuator is configured to move in a direction from the base of the housing to the apex of the housing and to cause deformation of the elastic membrane such that there is a change in volume within the housing.

7. The lung simulation apparatus as claimed in claim 1, wherein the mammalian lung is a human lung.

8. The lung simulation apparatus as claimed in claim 1, wherein the shape of the housing approximates the shape of a mammalian hemithorax.

9. The lung simulation apparatus as claimed in claim 1, wherein the lung simulation apparatus is a single lung simulation apparatus for simulating a state of a single living mammalian lung.

10. The lung simulation apparatus as claimed in claim 1, wherein the inflatable sac disposed within the housing is the only inflatable sac disposed within the housing.

11. The lung simulation apparatus as claimed in claim 9, wherein the single lung simulation apparatus is capable of being coupled to another similar single lung simulation apparatus to simulate a state of a pair of living mammalian lungs.

12. The lung simulation apparatus as claimed in claim 1, further comprising a port disposed on the housing for introduction or removal of fluid from the internal space.

13. The lung simulation apparatus as claimed in claim 1, further comprising a port for coupling to a pressure sensor that is configured to measure the pressure in the internal space for containing fluid.

14. The lung simulation apparatus as claimed in claim 1, wherein the inflatable sac comprises an opening for allowing gaseous exchange between an internal volume of the inflatable sac and an external environment.

15. The lung simulation apparatus as claimed in claim 1, wherein the housing has a rigidity that is higher than that of the inflatable sac.

16. The lung simulation apparatus as claimed in claim 1, wherein the housing is substantially transparent.

17. The lung simulation apparatus as claimed in claim 2, wherein the filler material has a volume to mass ratio of from 10 $cm^3/g$ to 150 $cm^3/g$ for maintaining structural shape of the inflatable sac when in the inflated state.

18. The lung simulation apparatus as claimed in claim 1, wherein the elastic membrane covering the open base of the housing forms a substantially fluid-tight seal.

19. The lung simulation apparatus as claimed in claim 1, further comprising liquid within the internal space for containing fluid.

20. The lung simulation apparatus as claimed in claim 1, wherein the internal space for containing fluid has a pressure of from about −25 $cmH_2O$ to about 20 $cmH_2O$.

21. The lung simulation apparatus as claimed in claim 1, wherein the inflatable sac is inflated to a volume of from about 1700 ml to about 3500 ml.

22. The lung simulation apparatus as claimed in claim 1, wherein the inflatable sac is capable of automatically changing its volume through gaseous exchange in response to changes in pressure in the internal space for containing fluid.

23. A method of making a lung simulation apparatus, the method comprising,
using a first mold to form a housing, the housing having a shape defined by an apex, a lateral surface defined by an inner concave surface, an outer convex surface and an open base;
using a second mold to form an inflatable sac having an opening and a base tapering to an apex when in an inflated state;
disposing the inflatable sac within the housing, the sac being in substantial conformance with the shape of the housing and approximating the shape of a living mammalian lung, when in an inflated state; and
covering the open base of the housing with an elastic membrane to form an internal space for containing fluid, the internal space being defined as the space between the housing and the inflatable sac and the space between the elastic membrane and the inflatable sac,
wherein the space for containing fluid has substantially the same dimensions as the anatomical dimensions of an intrapleural space of the living mammalian lung when the inflatable sac is in the inflated state.

24. The method as claimed in claim 23, wherein the inflatable sac comprises filler material for maintaining structural shape of the inflatable sac when the internal space of the lung simulation apparatus has a pressure that is higher than a pressure of an internal volume of the inflatable sac.

25. The method as claimed in claim 23, wherein the second mold is derived from the first mold or vice versa.

26. The method as claimed in claim 23, wherein the first mold is a positive mold of the second mold or vice versa.

27. The method as claimed in claim 23, further comprising providing the first mold having a base tapering to an apex, and a convex outer lateral surface.

28. The method as claimed in claim 23, further comprising providing the second mold having a base tapering to an apex, and a concave inner lateral surface.

29. The method as claimed in claim 23, wherein the step of providing the second mold comprises making the second mold using the first mold as a template.

30. The method as claimed in claim 23, wherein the step of covering the open base of the housing with an elastic membrane further comprises providing a fluid tight sealing.

31. The method as claimed in claim 23, further comprising coupling an actuator to the elastic membrane.

* * * * *